United States Patent
Agiwal et al.

(10) Patent No.: US 12,452,948 B2
(45) Date of Patent: Oct. 21, 2025

(54) METHOD AND APPARATUS FOR HANDLING SMALL DATA TRANSMISSION IN WIRELESS COMMUNICATION SYSTEM

(71) Applicant: Samsung Electronics Co., Ltd., Gyeonggi-do (KR)

(72) Inventors: Anil Agiwal, Gyeonggi-do (KR); Jaehyuk Jang, Gyeonggi-do (KR); Sangyeob Jung, Gyeonggi-do (KR)

(73) Assignee: Samsung Electronics co., Ltd., Seoul (KR)

( * ) Notice: Subject to any disclaimer, the term of this patent is extended or adjusted under 35 U.S.C. 154(b) by 395 days.

(21) Appl. No.: 18/009,917

(22) PCT Filed: Mar. 2, 2022

(86) PCT No.: PCT/KR2022/002921
§ 371 (c)(1),
(2) Date: Dec. 12, 2022

(87) PCT Pub. No.: WO2022/191492
PCT Pub. Date: Sep. 15, 2022

(65) Prior Publication Data
US 2023/0224997 A1    Jul. 13, 2023

(30) Foreign Application Priority Data

Mar. 8, 2021  (KR) .................. 10-2021-0029994
Mar. 16, 2021 (KR) .................. 10-2021-0034260

(51) Int. Cl.
*H04W 76/20* (2018.01)
*H04W 74/08* (2024.01)
(Continued)

(52) U.S. Cl.
CPC .......... *H04W 76/20* (2018.02); *H04W 76/30* (2018.02); *H04W 74/0833* (2013.01); *H04W 74/0836* (2024.01); *H04W 74/0838* (2024.01)

(58) Field of Classification Search
CPC ..... H04W 76/20; H04W 76/10; H04W 76/30; H04W 76/40; H04W 76/50;
(Continued)

(56) References Cited

U.S. PATENT DOCUMENTS 8,724,568 B2   5/2014   Jung et al.
9,565,703 B2   2/2017   Chun et al.
(Continued)

FOREIGN PATENT DOCUMENTS

WO   WO 2021/031112      2/2021
WO   WO-2022079692 A1 *  4/2022  ........... H04B 7/1851

OTHER PUBLICATIONS

PCT/ISA/210 Search Report issued on PCT/KR2022/002921, Jun. 13, 2022, pp. 3.
(Continued)

*Primary Examiner* — Phong La
(74) *Attorney, Agent, or Firm* — The Farrell Law Firm, P.C.

(57) ABSTRACT

The present disclosure relates to a 5G communication system or a 6G communication system for supporting higher data rates beyond a 4G communication system such as long term evolution (LTE). The present disclosure provides method and apparatus for SDT related procedures in next generation wireless communication system.

14 Claims, 21 Drawing Sheets

(51) Int. Cl.
  *H04W 76/30* (2018.01)
  *H04W 74/0833* (2024.01)
  *H04W 74/0836* (2024.01)
  *H04W 74/0838* (2024.01)

(58) Field of Classification Search
  CPC ......... H04W 74/0833; H04W 74/0836; H04W 74/0838; H04W 74/66; H04W 74/08; H04W 74/02; H04W 74/00
  See application file for complete search history.

(56) References Cited

U.S. PATENT DOCUMENTS

| | | | |
|---|---|---|---|
| 9,900,914 B2 | 2/2018 | Chun et al. | |
| 2020/0170069 A1* | 5/2020 | Shih | H04W 76/27 |
| 2021/0144742 A1* | 5/2021 | Jeon | H04W 74/0833 |
| 2021/0337625 A1* | 10/2021 | Tsai | H04W 76/27 |
| 2021/0410180 A1* | 12/2021 | Tsai | H04L 1/1819 |
| 2022/0132277 A1* | 4/2022 | Shrivastava | H04W 76/28 |
| 2022/0232641 A1* | 7/2022 | Lee | H04W 76/20 |
| 2023/0224997 A1* | 7/2023 | Agiwal | H04W 76/30 |
| 2023/0319895 A1* | 10/2023 | Park | H04W 72/23 370/329 |

OTHER PUBLICATIONS

PCT/ISA/237 Written Opinion issued on PCT/KR2022/002921, Jun. 13, 2022, pp. 4.
Lenovo, "Report from email discussion [POST112-e][550][SDT] Further details of CG aspects", R2-2100930, 3GPP RAN WG2 Meeting #113e, E-meeting, Jan. 14, 2021, pp. 33.
Apple, "Subsequent data transmission for SDT", R2-2101368, 3GPP TSG-RAN WG2 Meeting #113-e, E-meeting, Jan. 15, 2021, pp. 5.
ZTE Corporation et al., "Configured grant based small data transmission", R2-2101158, 3GPP TSGRAN WG2 #113e, eMeeting, Jan. 14, 2021, pp. 9.
Huawei et al., "Small data transmission with CG-based scheme", R2-2101213, 3GPP TSG-RAN WG2 #113-e, E-meeting, Jan. 15, 2021, pp. 11.
Session Chair (InterDigital), Report for Rel-17 Small Data and URLLC/IIoT and Rel-16 NR-U, Power Savings, and 2step RACH, R2-2101954, 3GPP TSG-RAN WG2 Meeting #113 Electronic, Jan. 25-Feb. 5, 2021, 25 pages.
Ericsson, "Details of CG Based SDT", R2-2009964, 3GPP TSG-RAN WG2 #112e, Nov. 2-13, 2020, 4 pages.
European Search Report dated Sep. 29, 2023 issued in counterpart application No. 22767388.6-1216, 13 pages.
European Search Report dated Jul. 25, 2025 issued in counterpart application No. 22767388.6-1206, 13 pages.
3GPP TS 38.321 V16.3.0, (Dec. 2020), pp. 154.
Korean Office Action dated Aug. 26, 2025 issued in counterpart application No. 10-2023-7029739, 13 pages.

* cited by examiner

METHOD AND APPARATUS FOR HANDLING SMALL DATA TRANSMISSION IN WIRELESS COMMUNICATION SYSTEM

PRIORITY

This application is a National Phase Entry of PCT International Application No. PCT/KR2022/002921, which was filed on Mar. 2, 2022, and claims priority to Korean Provisional Patent Application No. 10-2021-0029994, which was filed on Mar. 8, 2021, and Korean Patent Application No. 10-2021-0034260, which was filed on Mar. 16, 2021, the entire content of each of which is incorporated herein by reference.

TECHNICAL FIELD

The disclosure relates to a wireless communication system. Specifically, the disclosure relates to an apparatus, a method and a system for handling small data transmission (SDT) related procedures in wireless communication system.

BACKGROUND ART

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

Meanwhile, there have been various studies on SDT related procedures for enhanced wireless communication system recently.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

There are needs to enhance SDT procedure for next generation wireless communication system.

Solution to Problem

Aspects of the disclosure are to address at least the above-mentioned problems and/or disadvantages and to provide at least the advantages described below. Accordingly, an aspect of the disclosure is to provide a communication method and system for converging a sixth generation (6G) and a fifth generation (5G) communication system for supporting higher data rates beyond a fourth generation (4G).

In accordance with an aspect of the disclosure, a method performed by a terminal is provided. The method comprises: receiving, from a base station, a radio resource control (RRC) message including first information configuring a configured grant (CG) resource for small data transmission (SDT) and second information configuring a timing alignment timer (TAT) for SDT (TAT-SDT); starting, while the terminal is in an RRC inactive state, the TAT-SDT based on the second information; while an SDT procedure is ongoing based on the first information, releasing the CG resource for SDT upon expiry of the TAT-SDT; and identifying whether a response is received for an initial uplink packet transmitted to the base station during the SDT procedure, wherein, in case that the response is received, the ongoing SDT procedure is not terminated and a dynamic grant (DG) is used for the ongoing SDT procedure.

In accordance with an aspect of the disclosure, a method performed by a base station is provided. The method comprises: transmitting, to a terminal, a radio resource control (RRC) message including first information configuring a configured grant (CG) resource for small data transmission (SDT) and second information configuring a timing alignment timer (TAT) for SDT (TAT-SDT), wherein the TAT-SDT is started based on the second information while the terminal is in an RRC inactive state, wherein, while an SDT procedure is ongoing based on the first information, the CG resource for SDT is released upon expiry of the TAT-SDT, and wherein, in case that a response for an initial uplink packet received from the terminal during the SDT procedure is transmitted to the terminal, the ongoing SDT procedure is not terminated and a dynamic grant (DG) is used for the ongoing SDT procedure.

In accordance with another aspect of the disclosure, a terminal is provided. The terminal comprises a transceiver; and a controller configured to: receive, from a base station, a radio resource control (RRC) message including first information configuring a configured grant (CG) resource for small data transmission (SDT) and second information configuring a timing alignment timer (TAT) for SDT (TAT-SDT), start, while the terminal is in an RRC inactive state, the TAT-SDT based on the second information, while an SDT procedure is ongoing based on the first information, release the CG resource for SDT upon expiry of the TAT-SDT, and identify whether a response is received for an initial uplink packet transmitted to the base station during the SDT procedure, wherein, in case that the response is received, the ongoing SDT procedure is not terminated and a dynamic grant (DG) is used for the ongoing SDT procedure.

In accordance with another aspect of the disclosure, a base station is provided. The base station comprises a transceiver; and a controller configured to: transmit, to a terminal, a radio resource control (RRC) message including first information configuring a configured grant (CG) resource for small data transmission (SDT) and second information configuring a timing alignment timer (TAT) for SDT (TAT-SDT), wherein the TAT-SDT is started based on the second information while the terminal is in an RRC inactive state, wherein, while an SDT procedure is ongoing based on the first information, the CG resource for SDT is released upon expiry of the TAT-SDT, and wherein, in case that a response for an initial uplink packet received from the terminal during the SDT procedure is transmitted to the terminal, the ongoing SDT procedure is not terminated and a dynamic grant (DG) is used for the ongoing SDT procedure.

Advantageous Effects of Invention

According to various embodiments of the disclosure, SDT procedure can be efficiently enhanced.

BRIEF DESCRIPTION OF DRAWINGS

The above and other aspects, features, and advantages of certain embodiments of the disclosure will be more apparent from the following description taken in conjunction with the accompanying drawings, in which.

MODE FOR THE INVENTION

Figure 1:
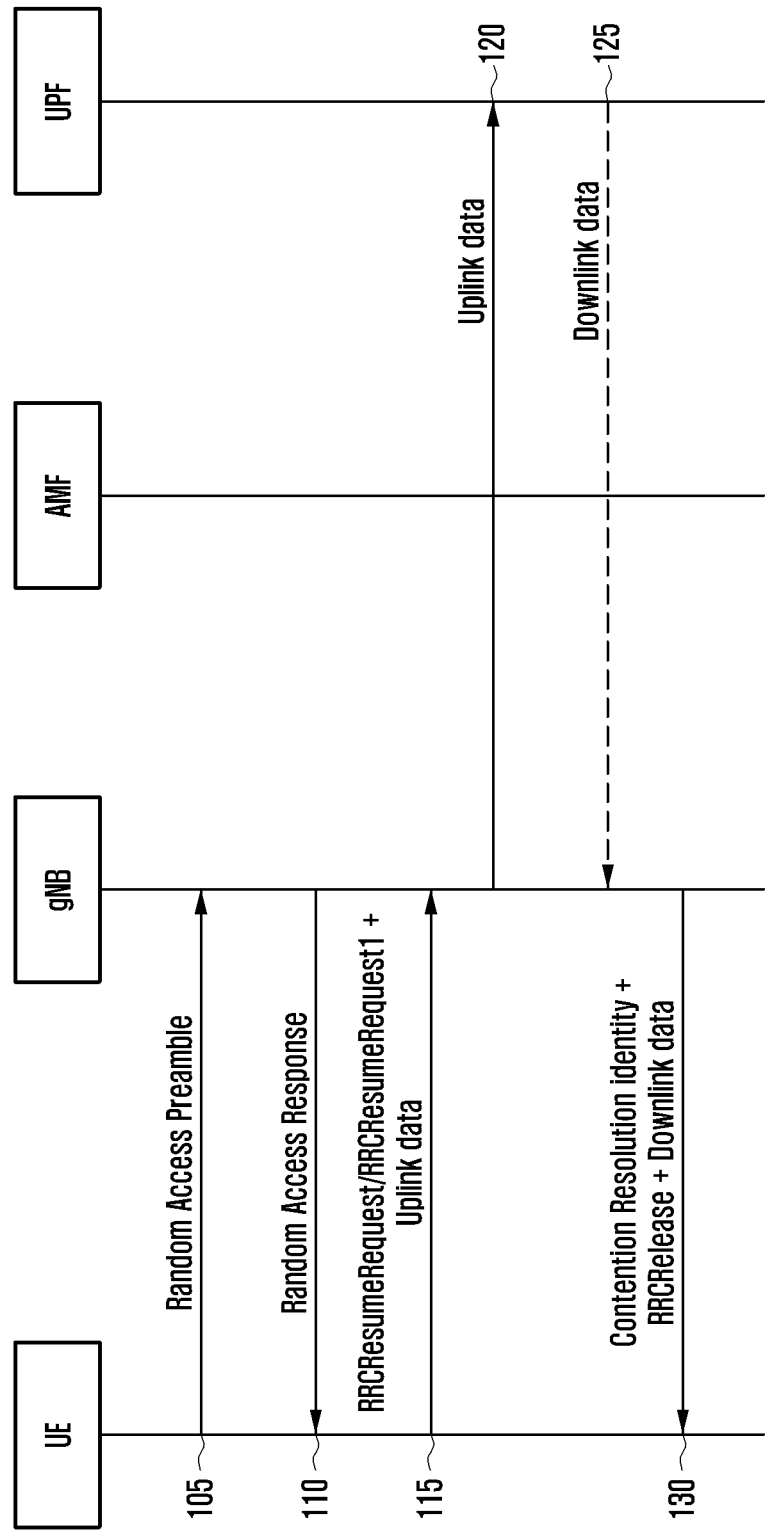
FIG. 1 illustrates an SDT related procedure in accordance with an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station" is an entity communicating with a user equipment (UE) and may be referred to as BS, base transceiver station (BTS), node B (NB), evolved NB (eNB), access point (AP), 5G NB (5GNB), or next generation node B (gNB), etc.

The "user equipment" is an entity communicating with a BS and/or another user equipment and may be referred to as UE, device, mobile station (MS), mobile equipment (ME), or terminal.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So fifth generation wireless communication system (also referred as next generation radio or NR) is being developed to meet the growing demand for high speed data services, support ultra-reliability and low latency applications.

The fifth generation wireless communication system supports not only lower frequency bands but also in higher frequency (e.g., mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. Few example use cases the fifth generation wireless communication system wireless system is expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the fifth generation wireless communication system operating in higher frequency (e.g., mmWave) bands, UE and gNB communicates with each other using Beamforming. Beamforming techniques are used to mitigate the propagation path losses and to increase the propagation distance for communication at higher frequency band. Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas.

In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal.

By using beamforming technique, a transmitter can make plurality of transmit beam patterns of different directions. Each of these transmit beam patterns can be also referred as TX beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of RX beam patterns of different directions. Each of these receive patterns can be also referred as RX beam.

CA(carrier aggregation)/Multi-connectivity in fifth generation wireless communication system: The fifth generation wireless communication system, supports standalone mode of operation as well dual connectivity (DC). In DC a multiple Rx/Tx UE may be configured to utilize resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-RAT Dual Connectivity (MR-DC) operation whereby a UE in radio resource control connected (RRC_CONNECTED) is configured to utilize radio resources provided by two distinct schedulers, located in two different nodes connected via a non-ideal backhaul and providing either E-UTRA (Evolved Universal Mobile Telecommunications System (UMTS) Terrestrial Radio Access) (i.e. if the node is an ng-eNB) or NR access (i.e. if the node is a gNB). In NR for a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells. In NR the term Master Cell Group (MCG) refers to a group of serving cells associated with the Master Node, comprising of the Primary Cell (PCell) and optionally one or more Secondary Cells (SCells). In NR the term Secondary Cell Group (SCG) refers to a group of serving cells associated with the Secondary Node, comprising of the Primary SCG cell (PSCell) and optionally one or more SCells. In NR PCell refers to a serving cell in MCG, operating on the primary frequency, in which the UE either performs the initial connection establishment procedure or initiates the connection reestablishment procedure. In NR for a UE configured with CA, Scell is a cell providing additional radio resources on top of Special Cell. PSCell refers to a serving cell in SCG in which the UE performs random access when performing the Reconfiguration with Sync procedure. For Dual Connectivity operation the term SpCell (i.e. Special Cell) refers to the PCell of the MCG or the PSCell of the SCG, otherwise the term Special Cell refers to the PCell.

System information acquisition in fifth generation wireless communication system: In the fifth generation wireless communication system, node B (gNB) or base station in cell broadcast Synchronization Signal and PBCH block (SSB) consists of primary and secondary synchronization signals (PSS, SSS) and system information. System information includes common parameters needed to communicate in cell. In the fifth generation wireless communication system (also referred as next generation radio or NR), System Information (SI) is divided into the MIB and a number of SIBs where:

- the MIB is always transmitted on the BCH with a periodicity of 80 ms and repetitions made within 80 ms and it includes parameters that are needed to acquire SIB1 from the cell.
- the SIB1 is transmitted on the DL-SCH with a periodicity of 160 ms and variable transmission repetition. The default transmission repetition periodicity of SIB1 is 20 ms but the actual transmission repetition periodicity is up to network implementation. The scheduling information in SIB 1 includes mapping between SIBs and SI messages, periodicity of each SI message and SI window length. The scheduling information in SIB 1 includes an indicator for each SI message, which indicates whether the concerned SI message is being broadcasted or not. If at least one SI message is not being broadcasted, SIB1 may include random access resources (PRACH preamble(s) and PRACH resource(s)) for requesting gNB to broadcast one or more SI message(s).
- SIBs other than SIB1 are carried in SystemInformation (SI) messages, which are transmitted on the DL-SCH. Only SIBs having the same periodicity can be mapped to the same SI message. Each SI message is transmitted within periodically occurring time domain windows (referred to as SI-windows with same length for all SI messages). Each SI message is associated with a SI-window and the SI-windows of different SI messages do not overlap. That is, within one SI-window only the corresponding SI message is transmitted. Any SIB except SIB1 can be configured to be cell specific or area specific, using an indication in SIB 1. The cell specific SIB is applicable only within a cell that provides the SIB while the area specific SIB is applicable within an area referred to as SI area, which consists of one or several cells and is identified by systemInformation-AreaID.

In the fifth generation wireless communication system, Physical Downlink Control Channel (PDCCH) is used to schedule downlink (DL) transmissions on Physical Downlink Shared Channel (PDSCH) and uplink (UL) transmissions on Physical Uplink Shared Channel (PUSCH), where the Downlink Control Information (DCI) on PDCCH includes: Downlink assignments containing at least modulation and coding format, resource allocation, and hybrid automatic repeat request (HARM) information related to downlink shared channel (DL-SCH); Uplink scheduling grants containing at least modulation and coding format, resource allocation, and HARQ information related to uplink shared channel (UL-SCH). In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the physical resource block(s) (PRB(s)) and orthogonal frequency division multiplexing (OFDM) symbol(s) where the UE may assume no transmission is intended for the UE; Transmission of transmission power control (TPC) commands for Physical Uplink Control Channel (PUCCH) and PUSCH; Transmission of one or more TPC commands for sounding reference signal (SRS) transmissions by one or more UEs; Switching a UE's active bandwidth part; Initiating a random access procedure.

A UE monitors a set of PDCCH candidates in the configured monitoring occasions in one or more configured COntrol REsource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own demodulation reference signal (DMRS). Quadrature phase shift keying (QPSK) modulation is used for PDCCH.

In fifth generation wireless communication system, a list of search space configurations are signaled by gNB for each configured bandwidth part (BWP) wherein each search configuration is uniquely identified by an identifier. Identifier of search space configuration to be used for specific purpose such as paging reception, SI reception, random access response (RAR) reception is explicitly signaled by gNB. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation 1 below:

$$(y*(\text{number of slots in a radio frame})+x-\text{Monitoring-offset-PDCCH-slot}) \bmod (\text{Monitoring-periodicity-PDCCH-slot})=0;$$ [Equation 1]

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. Search space configuration includes the identifier of CORESET configuration associated with it. A list of CORESET configurations are signaled by gNB for each configured BWP wherein each CORESET configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported subcarrier spacing (SCS) is predefined in NR. Each CORESET configuration is associated with a list of TCI (Transmission configuration indicator) states. One DL reference signal (RS) identifier (ID) (synchronization signal block (SSB) or channel state information reference signal (CSI-RS)) is configured per TCI state. The list of TCI states corresponding to a CORESET configuration is signaled by gNB via RRC signaling. One of the TCI state in TCI state list is activated and indicated to UE by gNB. TCI state indicates the DL TX beam (DL TX beam is quasi-collocated (QCLed) with SSB/CSI RS of TCI state) used by GNB for transmission of PDCCH in the PDCCH monitoring occasions of a search space.

BWP operation in fifth generation wireless communication system: In fifth generation wireless communication system bandwidth adaptation (BA) is supported. With BA, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP). BA is achieved by configuring RRC connected UE with BWP(s) and telling the UE which of the configured BWPs is currently the active one.

Random access in fifth generation wireless communication system: In the 5G wireless communication system, random access (RA) is supported. Random access (RA) is used to achieve uplink (UL) time synchronization. RA is used during initial access, handover, RRC connection re-establishment procedure, scheduling request transmission, SCG addition/modification, beam failure recovery and data or control information transmission in UL by non-synchronized UE in RRC_CONNECTED state. Several types of random access procedure is supported.

Contention based random access (CBRA): This is also referred as 4 step CBRA. In this type of random access, UE first transmits Random Access preamble (also referred as Msg1) and then waits for Random access response (RAR) in the RAR window. RAR is also referred as Msg2. GNB transmits the RAR on PDSCH. PDCCH scheduling the PDSCH carrying RAR is addressed to RA-radio network temporary identifier (RA-RNTI). RA-RNTI identifies the time-frequency resource (also referred as physical RA channel (PRACH) occasion or PRACH transmission (TX) occasion or RA channel (RACH) occasion) in which RA preamble was detected by gNB. The RA-RNTI is calculated as follows: RA-RNTI=$1+s\_id+14*t\_id+14*80*f\_id+14*80*8*ul\_carrier\_id$, where $s\_id$ is the index of the first OFDM symbol of the PRACH occasion where UE has transmitted Msg1, i.e. RA preamble; 0≤s_id<14; t_id is the index of the first slot of the PRACH occasion (0≤t_id<80); f_id is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier. Several RARs for various Random access preambles detected by gNB can be multiplexed in the same RAR media access control (MAC) protocol data unit (PDU) by gNB. An RAR in MAC PDU corresponds to UE's RA preamble transmission if the RAR includes an RA preamble identifier (RAPID) of RA preamble transmitted by the UE. If the RAR corresponding to its RA preamble transmission is not received during the RAR window and UE has not yet transmitted the RA preamble for a configurable (configured by gNB in RACH configuration) number of times, the UE goes back to first step i.e. select random access resource (preamble/RACH occasion) and transmits the RA preamble. A backoff may be applied before going back to first step.

If the RAR corresponding to its RA preamble transmission is received the UE transmits message 3 (Msg3) in UL grant received in RAR. Msg3 includes message such as RRC connection request, RRC connection re-establishment request, RRC handover confirm, scheduling request, SI request etc. It may include the UE identity (i.e. cell-radio network temporary identifier (C-RNTI) or system architecture evolution (SAE)-temporary mobile subscriber identity (S-TMSI) or a random number). After transmitting the Msg3, UE starts a contention resolution timer. While the contention resolution timer is running, if UE receives a PDCCH addressed to C-RNTI included in Msg3, contention resolution is considered successful, contention resolution timer is stopped and RA procedure is completed. While the contention resolution timer is running, if UE receives contention resolution MAC CE including the UE's contention resolution identity (first X bits of common control channel (CCCH) service data unit (SDU) transmitted in Msg3), contention resolution is considered successful, contention resolution timer is stopped and RA procedure is completed. If the contention resolution timer expires and UE has not yet transmitted the RA preamble for a configurable number of times, UE goes back to first step i.e. select random access resource (preamble/RACH occasion) and transmits the RA preamble. A backoff may be applied before going back to first step.

Contention free random access (CFRA): This is also referred as legacy CFRA or 4 step CFRA. CFRA procedure is used for scenarios such as handover where low latency is required, timing advance establishment for Scell, etc. ENB) assigns to UE dedicated Random access preamble. UE transmits the dedicated RA preamble. ENB transmits the RAR on PDSCH addressed to RA-RNTI. RAR conveys RA preamble identifier and timing alignment information. RAR may also include UL grant. RAR is transmitted in RAR window similar to CBRA procedure. CFRA is considered successfully completed after receiving the RAR including RAPID of RA preamble transmitted by the UE. In case RA is initiated for beam failure recovery, CFRA is considered successfully completed if PDCCH addressed to C-RNTI is received in search space for beam failure recovery. If the RAR window expires and RA is not successfully completed and UE has not yet transmitted the RA preamble for a configurable (configured by gNB in RACH configuration) number of times, the UE retransmits the RA preamble.

For certain events such has handover and beam failure recovery if dedicated preamble(s) are assigned to UE, during first step of random access i.e. during random access resource selection for Msg1 transmission UE determines whether to transmit dedicated preamble or non-dedicated preamble. Dedicated preambles is typically provided for a subset of SSBs/CSI RSs. If there is no SSB/CSI RS having DL RSRP above a threshold amongst the SSBs/CSI RSs for which contention free random access resources (i.e. dedicated preambles/ROs) are provided by gNB, UE select non dedicated preamble. Otherwise UE select dedicated preamble. So during the RA procedure, one random access attempt can be CFRA while other random access attempt can be CBRA.

2 step contention based random access (2 step CBRA): In the first step, UE transmits random access preamble on PRACH and a payload (i.e., MAC PDU) on PUSCH. The random access preamble and payload transmission is also referred as MsgA. In the second step, after MsgA transmission, the UE monitors for a response from the network (i.e., gNB) within a configured window. The response is also referred as MsgB. GNB) transmits the MsgB on PDSCH. PDCCH scheduling the PDSCH carrying MsgB is addressed to MsgB-radio network temporary identifier (MSGB-RNTI). MSGB-RNTI identifies the time-frequency resource (also referred as PRACH occasion or PRACH TX occasion or RACH occasion) in which RA preamble was detected by gNB. The MSGB-RNTI is calculated as follows: RA-RNTI=1+s_id+14*t_id+14*80*f_id+14*80*8*ul_carrier_id+14*80*8*2, where s_id is the index of the first OFDM symbol of the PRACH occasion where UE has transmitted Msg1, i.e. RA preamble; 0≤s_id<14; t_id is the index of the first slot of the PRACH occasion (0≤t_id<80); fid is the index of the PRACH occasion within the slot in the frequency domain (0≤f_id<8), and ul_carrier_id is the UL carrier used for Msg1 transmission (0 for NUL carrier and 1 for SUL carrier.

If CCCH SDU was transmitted in MsgA payload, UE performs contention resolution using the contention resolution information in MsgB. The contention resolution is successful if the contention resolution identity received in MsgB matches first 48 bits of CCCH SDU transmitted in MsgA. If C-RNTI was transmitted in MsgA payload, the contention resolution is successful if UE receives PDCCH addressed to C-RNTI. If contention resolution is successful, random access procedure is considered successfully completed. Instead of contention resolution information corresponding to the transmitted MsgA, MsgB may include a fallback information corresponding to the random access preamble transmitted in MsgA. If the fallback information is received, UE transmits Msg3 and performs contention resolution using Msg4 as in CBRA procedure. If contention resolution is successful, random access procedure is considered successfully completed. If contention resolution fails upon fallback (i.e. upon transmitting Msg3), UE retransmits MsgA. If configured window in which UE monitor network response after transmitting MsgA expires and UE has not received MsgB including contention resolution information or fallback information as explained above, UE retransmits MsgA. If the random access procedure is not successfully completed even after transmitting the msgA configurable number of times, UE fallbacks to 4 step RACH procedure i.e. UE only transmits the PRACH preamble.

MsgA payload may include one or more of CCCH SDU, dedicated control channel (DCCH) SDU, dedicated traffic channel (DTCH) SDU, buffer status report (BSR) MAC CE, power headroom report (PHR) MAC CE, SSB information, C-RNTI MAC CE, or padding. MsgA may include UE ID (e.g. random ID, S-TMSI, C-RNTI, resume ID, etc.) along with preamble in first step. The UE ID may be included in the MAC PDU of the MsgA. UE ID such as C-RNTI may be carried in MAC CE wherein MAC CE is included in MAC PDU. Other UE IDs (such random ID, S-TMSI, C-RNTI, resume ID, etc.) may be carried in CCCH SDU. The UE ID can be one of random ID, S-TMSI, C-RNTI, resume ID, IMSI, idle mode ID, inactive mode ID, etc. The UE ID can be different in different scenarios in which UE performs the RA procedure. When UE performs RA after power on (before it is attached to the network), then UE ID is the random ID. When UE perform RA in IDLE state after it is attached to network, the UE ID is S-TMSI. If UE has an assigned C-RNTI (e.g. in connected state), the UE ID is C-RNTI. In case UE is in INACTIVE state, UE ID is resume ID. In addition to UE ID, some addition ctrl information can be sent in MsgA. The control information may be included in the MAC PDU of the MsgA. The control information may include one or more of connection request indication, connection resume request indication, SI request indication, buffer status indication, beam information (e.g. one or more DL TX beam ID(s) or SSB ID(s)), beam failure recovery indication/information, data indicator, cell/BS/TRP switching indication, connection re-establishment indication, reconfiguration complete or handover complete message, etc.

2 step contention free random access (2 step CFRA): In this case gNB assigns to UE dedicated Random access preamble(s) and PUSCH resource(s) for MsgA transmission. RO(s) to be used for preamble transmission may also be indicated. In the first step, UE transmits random access preamble on PRACH and a payload on PUSCH using the contention free random access resources (i.e. dedicated preamble/PUSCH resource/RO). In the second step, after MsgA transmission, the UE monitors for a response from the network (i.e. gNB) within a configured window. The response is also referred as MsgB.

GNB transmits the MsgB on PDSCH. PDCCH scheduling the PDSCH carrying MsgB is addressed to MSGB-RNTI. MSGB-RNTI identifies the time-frequency resource (also referred as PRACH occasion or PRACH TX occasion or RACH occasion) in which RA preamble was detected by gNB. The MSGB-RNTI is calculated as follows: RA-RNTI=1+s_id+14*t_id+14*80*f_id+14*80*8*ul_carrier_id+14*80*8*2, where s_id is the index of the first OFDM symbol of the PRACH occasion where UE has transmitted Msg1, i.e. RA preamble; $0 \leq s\_id < 14$; t_id is the index of the first slot of the PRACH occasion ($0 \leq t\_id < 80$); f_id is the index of the PRACH occasion within the slot in the frequency domain ($0 \leq f\_id < 8$), and ul_carrier_id is the UL carrier used for Msg1 transmission (0 for NUL carrier and 1 for SUL carrier.

If UE receives PDCCH addressed to C-RNTI, random access procedure is considered successfully completed. If UE receives fallback information corresponding to its transmitted preamble, random access procedure is considered successfully completed.

For certain events such has handover and beam failure recovery if dedicated preamble(s) and PUSCH resource(s) are assigned to UE, during first step of random access i.e. during random access resource selection for MsgA transmission UE determines whether to transmit dedicated preamble or non dedicated preamble. Dedicated preambles is typically provided for a subset of SSB s/CSI RSs. If there is no SSB/CSI RS having DL RSRP above a threshold amongst the SSBs/CSI RSs for which contention free random access resources (i.e. dedicated preambles/ROs/PUSCH resources) are provided by gNB, UE select non dedicated preamble. Otherwise UE select dedicated preamble. So during the RA procedure, one random access attempt can be 2 step CFRA while other random access attempt can be 2 step CBRA.

Upon initiation of random access procedure, UE first selects the carrier (SUL or NUL). If the carrier to use for the Random Access procedure is explicitly signalled by gNB, UE select the signalled carrier for performing Random Access procedure. If the carrier to use for the Random Access procedure is not explicitly signalled by gNB; and if the Serving Cell for the Random Access procedure is configured with supplementary uplink and if the RSRP of the downlink pathloss reference is less than rsrpThreshold-SSB-SUL: UE select the SUL carrier for performing Random Access procedure. Otherwise, UE select the NUL carrier for performing Random Access procedure. Upon selecting the UL carrier, UE determines the UL and DL BWP for random access procedure. UE then determines whether to perform 2 step or 4 step RACH for this random access procedure.

If this random access procedure is initiated by PDCCH order and if the raPreambleIndex explicitly provided by PDCCH is not 0b000000, UE selects 4 step RACH.

else if 2 step contention free random access resources are signaled by gNB for this random access procedure, UE selects 2 step RACH.

else if 4 step contention free random access resources are signaled by gNB for this random access procedure, UE selects 4 step RACH.

else if the UL BWP selected for this random access procedure is configured with only 2 step RACH resources, UE selects 2 step RACH.

else if the UL BWP selected for this random access procedure is configured with only 4 step RACH resources, UE selects 4 step RACH.

else if the UL BWP selected for this random access procedure is configured with both 2 step and 4 step RACH resources, if RSRP of the downlink pathloss reference is below a configured threshold, UE selects 4 step RACH. Otherwise UE selects 2 step RACH.

In the 5th generation (also referred as NR) wireless communication system UE can be in one of the following RRC state: RRC IDLE, RRC INACTIVE and RRC CONNECTED. The RRC states can further be characterized as follows:

In RRC IDLE state, a UE specific discontinuous reception (DRX) may be configured by upper layers (i.e. non-access stratum (NAS)). The UE, monitors Short Messages transmitted with P-RNTI over DCI; Monitors a Paging channel for CN paging using 5G-S-TMSI; —Performs neighbouring cell measurements and cell (re-)selection; Acquires system information and can send SI request (if configured).

In RRC_INACTIVE state, a UE specific DRX may be configured by upper layers or by RRC layer; In this state, UE stores the UE Inactive AS context. A RAN-based notification area is configured by RRC layer. The UE monitors Short Messages transmitted with paging radio network temporary identifier (P-RNTI) over DCI; Monitors a Paging channel for core network (CN) paging using 5G-system architecture evolution (SAE)-temporary mobile subscriber identity (5G-S-TMSI) and RAN paging using full-RNTI; Performs neighboring cell measurements and cell (re-)selection; Performs radio access node (RAN)-based notification area updates periodically and when moving outside the configured RAN-based notification area; Acquires system information and can send SI request (if configured).

In the RRC_CONNECTED, the UE stores the access stratum (AS) context. Unicast data is transmitted/received to/from UE. At lower layers, the UE may be configured with a UE specific DRX. The UE, monitors Short Messages transmitted with P-RNTI over DCI, if configured; Monitors control channels associated with the shared data channel to determine if data is scheduled for it; Provides channel quality and feedback information; Performs neighboring cell measurements and measurement reporting; Acquires system information.

The 5G or Next Generation Radio Access Network (NG-RAN) based on NR consists of NG-RAN nodes where NG-RAN node is a gNB, providing NR user plane and control plane protocol terminations towards the UE. The gNBs are also connected by means of the NG interfaces to the 5GC, more specifically to the AMF (Access and Mobility Management Function) by means of the NG-C interface and to the UPF (User Plane Function) by means of the NG-U interface. In NR system, the UE may use DRX in RRC_IDLE and RRC_INACTIVE state in order to reduce power consumption. In the RRC_IDLE/RRC_INACTIVE state UE wake ups at regular intervals (i.e. every DRX cycle) for short periods to receive paging, to receive SI update notification and to receive emergency notifications. Paging message is transmitted using PDSCH. PDCCH is addressed to P-RNTI if there is a paging message in PDSCH. P-RNTI is common for all UEs. UE identity (e.g., S-TMSI for RRC_IDLE UE or I-RNTI for RRC_INACTIVE UE) is included in paging message to indicate paging for a specific UE. Paging message may include multiple UE identities to page multiple UEs. Paging message is broadcasted (i.e., PDCCH is masked with P-RNTI) over data channel (e.g., PDSCH). System information (SI) update and emergency notifications are included in DCI and PDCCH carrying this DCI is addressed to P-RNTI. In the RRC idle/inactive mode UE monitors one paging occasion (PO) every DRX cycle. In the RRC idle/inactive mode UE monitors PO in initial DL BWP. In RRC connected state UE monitors one or more POs to receive SI update notification and to receive emergency notifications. In RRC connected state, UE can monitor any PO in paging DRX cycle and monitors at least one PO in SI modification period. In the RRC idle/inactive mode UE monitors PO every DRX cycle in its active DL BWP. A PO is a set of 'S' PDCCH monitoring occasions for paging, where 'S' is the number of transmitted SSBs (i.e. the SSB consists of primary synchronization signal (PSS) and secondary synchronization signal (SSS) and PBCH) in cell. UE first determines the paging frame (PF) and then determines the PO with respect to the determined PF. One PF is a radio frame (10 ms).

The PF for a UE is the radio frame with system frame number 'SFN' which satisfies the equation (SFN+ PF_offset) mod T=(T div N)*(UE_ID mod N).

Index (i_s), indicating the index of the PO is determined by i_s=floor(UE ID/N) mod Ns.

T is DRX cycle of the UE.

In RRC_INACTIVE state, T is determined by the shortest of the UE specific DRX value configured by RRC, UE specific DRX value configured by NAS, and a default DRX value broadcast in system information.

In RRC_IDLE state, T is determined by the shortest of UE specific DRX value configured by NAS, and a default DRX value broadcast in system information. If UE specific DRX is not configured by upper layers (i.e. NAS), the default value is applied.

N: number of total paging frames in T
Ns: number of paging occasions for a PF
PF_offset: offset used for PF determination
UE_ID: 5G-S-TMSI mod 1024

Parameters Ns, nAndPagingFrameOffset, and the length of default DRX Cycle are signaled in SIB 1. The values of N and PF_offset are derived from the parameter nAndPagingFrameOffset. If the UE has no 5G-S-TMSI, for instance when the UE has not yet registered onto the network, the UE shall use as default identity UE_ID=0 in the PF and i_s formulas above.

The PDCCH monitoring occasions for paging are determined based on paging search space configuration (paging-SearchSpace) signaled by gNB.

When SearchSpaceId=0 is configured for paging-SearchSpace, the PDCCH monitoring occasions for paging are same as for RMSI. When SearchSpaceId=0 is configured for pagingSearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE monitors the (i_s+1)th PO. The PDCCH monitoring occasions for paging are determined based on paging search space configuration (paging-SearchSpace) signaled by gNB. The PDCCH monitoring occasions for paging which are not overlapping with UL symbols (determined according to tdd-UL-DL-ConfigurationCommon) are sequentially numbered from zero starting from the 1st PDCCH monitoring occasion for paging in the PF. The gNB may signal parameter firstPDCCH-MonitoringOccasionOfPO for each PO corresponding to a PF. When firstPDCCH-MonitoringOccasionOfPO is signalled, the (i_s+1)th PO is a set of 'S' consecutive PDCCH monitoring occasions for paging starting from the PDCCH monitoring occasion number indicated by firstPDCCH-MonitoringOccasionOfPO (i.e. the (i_s+ 1)th value of the firstPDCCH-MonitoringOccasionOfPO parameter). Otherwise, the (i_s+1)th PO is a set of 'S' consecutive PDCCH monitoring occasions for paging starting from the (i_s*S)th PDCCH monitoring occasion for paging. 'S' is the number of actual transmitted SSBs determined according to parameter ssb-PositionsInBurst signalled in SystemInformation-Block1 received from gNB. The parameter firstPDCCH-MonitoringOccasionOfPO is signalled in SIB1 for paging in initial DL BWP. For paging in a DL BWP other than the initial DL BWP, the parameter firstPDCCH-MonitoringOccasionOfPO is signaled in the corresponding BWP configuration.

The PDCCH addressed to P-RNTI carries information according to DCI format 1_0. The following information is transmitted by means of the DCI format 1_0 with cyclic redundancy check (CRC) scrambled by P-RNTI:

Short Messages Indicator—2 bits according to Table 1.

Short Messages—8 bits according to Table 2. If only the scheduling information for Paging is carried, this bit field is reserved.

Frequency domain resource assignment—$\lceil \log_2(N_{RB}^{DL,BWP}(N_{RB}^{DL,BWP}+1)/2) \rceil$ bits.

If only the short message is carried, this bit field is reserved.

$N_{RB}^{DL,BWP}$ is the size of CORESET 0

Time domain resource assignment—4 bits. If only the short message is carried, this bit field is reserved.

VRB-to-PRB mapping—1 bit. If only the short message is carried, this bit field is reserved.

Modulation and coding scheme—5 bits. If only the short message is carried, this bit field is reserved.

TB scaling—2 bits. If only the short message is carried, this bit field is reserved.

Reserved bits—6 bits

TABLE 1

| Bit field | Short Message indicator |
| --- | --- |
| 00 | Reserved |
| 01 | Only scheduling information for Paging is present in the DCI |
| 10 | Only short message is present in the DCI |
| 11 | Both scheduling information for Paging and short message are present in the DCI |

Table 2 defines Short Message. Bit 1 is the most significant bit.

TABLE 2

| Bit | Short Message |
| --- | --- |
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3-8 | Reserved |

In 5G wireless communication system, small data transmission (SDT) procedure in RRC_INACTIVE is supported. The uplink data can be transmitted in Msg3 in case of 4 step RA procedure and in MsgA in case of 2 step RA procedure. FIG. 1 illustrates an SDT related procedure in accordance with an embodiment of the disclosure. FIG. 1 shows an example signaling flow for small data transmission using 4 step RA.

Criteria to initiate 4 step RA for SDT is met. UE select preamble/RO from preambles/ROs for SDT. UE transmits random access preamble and receives RAR including UL grant for Msg3 transmission (105, 110).

The UE sends an RRCResumeRequest/RRCResumeRequest1 to the gNB (same as the last serving GNB) on SRB 0 (115). It includes full/short I-RNTI (resumeIdentity), the resume cause (resumeCause), and an authentication token (resumeMAC-I). The I-RNTI (short or full I-RNTI) is used for context identification and its value shall be the same as the I-RNTI that the UE had received from the last serving gNB in the RRCRelease with suspendConfig message. The ResumeMAC-I is a 16-bit message authentication token, the UE shall calculate it using the integrity algorithm (NIA or EIA) in the stored AS security context, which was negotiated between the UE and the last serving gNB and the KRRCint from the stored AS security context with the following inputs:

KEY: it shall be set to current $K_{RRCint}$;
BEARER: all its bits shall be set to 1.
DIRECTION: its bit shall be set to 1;
COUNT: all its bits shall be set to 1;
MESSAGE: it shall be set to VarResumeMAC-Input with following inputs:
source PCI (set to the physical cell identity of the PCell the UE was connected to prior to suspension of the RRC connection)
target Cell-ID (Set to the cellIdentity of the first PLMN-Identity included in the PLMN-IdentityInfoList broadcasted in SIB1 of the target cell i.e. the cell to which the UE is sending small data)
source C-RNTI (Set to C-RNTI that the UE had in the PCell it was connected to prior to suspension of the RRC connection).

The UE resumes SRB(s) and DRB(s), derives new security keys using the NextHopChainingCount provided in the RRCRelease message of the previous RRC connection and re-establishes the AS security. The user data are ciphered and integrity protected (Only for DRBs configured with UP integrity protection) and transmitted on DTCH multiplexed with the RRCResumeRequest/RRCResumeRequest1 message on CCCH/CCCH1.

2. gNB validates the resumeMAC-I and delivers the uplink data to UPF (120).

3. The gNB sends the RRCRelease message to keep the UE in RRC_INACTIVE. PDCCH is addressed to TC-RNTI. If downlink data is available, they are sent ciphered and integrity protected (Only for DRBs configured with UP integrity protection) on DTCH multiplexed with the RRCRelease message on DCCH (125, 130). GNB may decide not to send the RRCRelease message together with contention Resolution Identity. In this case upon completion of random access, UE monitors PDCCH addressed to C-RNTI. UL/DL data can be exchanged between UE and gNB until RRCRelease message is received or SDT procedure is terminated.

Figure 2:
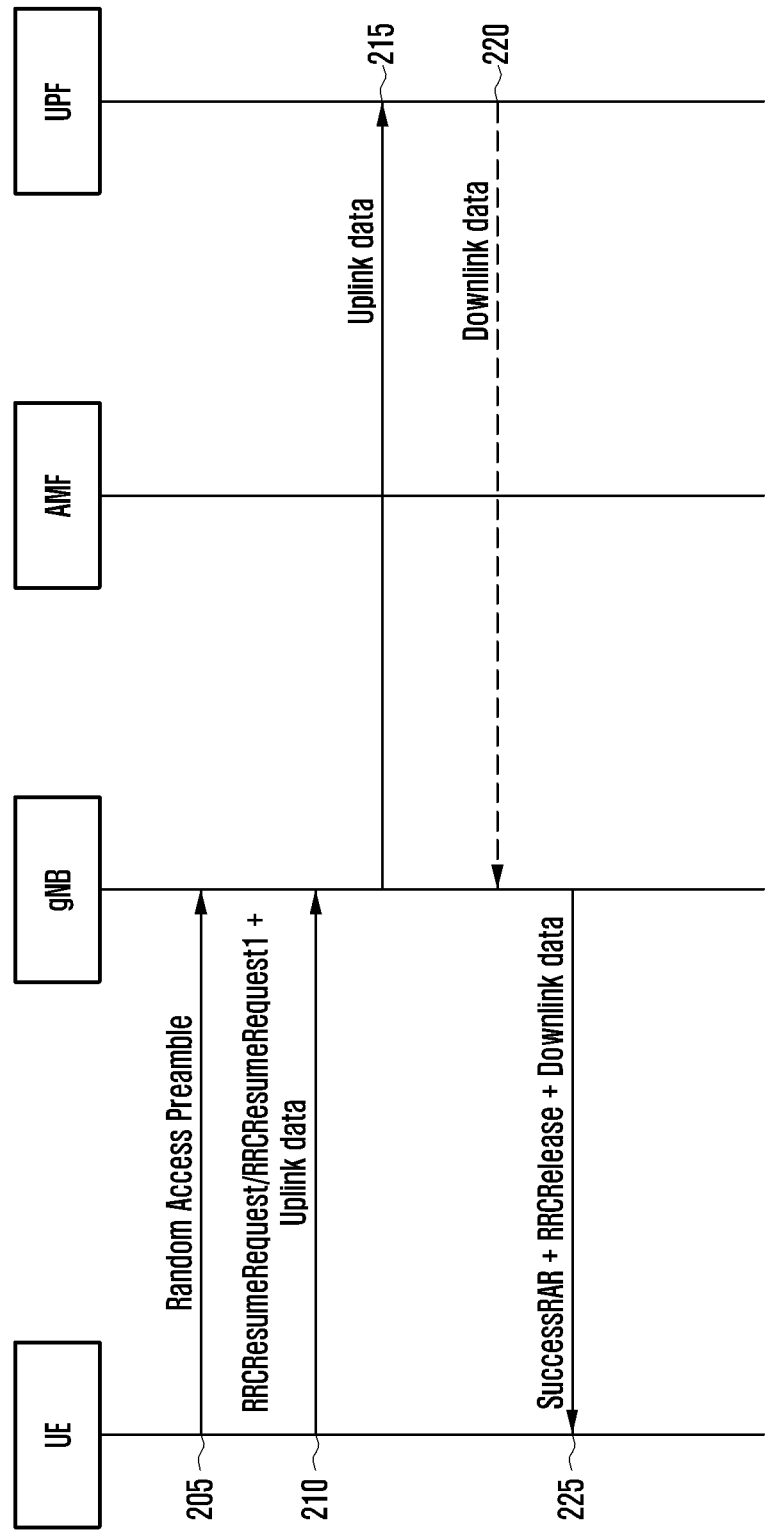
FIG. 2 illustrates another SDT related procedure in accordance with an embodiment of the disclosure.

FIG. 2 illustrates another SDT related procedure in accordance with an embodiment of the disclosure. FIG. 2 shows the signaling flow for small data transmission using 2 step RA.

Criteria to initiate 2 step RA for SDT is met. UE select preamble/RO/PO from preambles/ROs/POs for SDT. UE transmits random access preamble (205).

In the MsgA payload, the UE sends an RRCResumeRequest/RRCResumeRequest1 to the gNB (same as the last serving GNB) on SRB 0 (210). It includes full/short I-RNTI (resumeIdentity), the resume cause (resumeCause), and an authentication token (resumeMAC-I). The I-RNTI (short or full I-RNTI) is used for context identification and its value shall be the same as the I-RNTI that the UE had received from the last serving gNB in the RRCRelease with suspendConfig message. The ResumeMAC-I is a 16-bit message authentication token, the UE shall calculate it using the integrity algorithm (NIA or EIA) in the stored AS security context, which was negotiated between the UE and the last serving gNB and the KRRCint from the stored AS security context with the following inputs:

KEY: it shall be set to current $K_{RRCint}$;
BEARER: all its bits shall be set to 1.
DIRECTION: its bit shall be set to 1;
COUNT: all its bits shall be set to 1;
MESSAGE: it shall be set to VarResumeMAC-Input with following inputs:
source PCI (set to the physical cell identity of the PCell the UE was connected to prior to suspension of the RRC connection)
target Cell-ID (Set to the cellIdentity of the first PLMN-Identity included in the PLMN-IdentityInfoList broadcasted in SIB1 of the target cell i.e. the cell to which the UE is sending small data)
source C-RNTI (Set to C-RNTI that the UE had in the PCell it was connected to prior to suspension of the RRC connection).

The UE resumes all SRBs and DRBs, derives new security keys using the NextHopChainingCount provided in the RRCRelease message of the previous RRC connection and re-establishes the AS security. The user data are ciphered and integrity protected (Only for DRBs configured with UP integrity protection) and transmitted on DTCH multiplexed with the RRCResumeRequest/RRCResumeRequest1 message on CCCH/CCCH1.

2. gNB validates the resumeMAC-I and delivers the uplink data to UPF (215).

3. The gNB sends the RRCRelease message to keep the UE in RRC_INACTIVE in MsgB along with successRAR. PDCCH is addressed to C-RNTI. If downlink data is available, they are sent ciphered and integrity protected (Only for DRBs configured with UP integrity protection) on DTCH multiplexed with the RRCRelease message on DCCH (220, 225). GNB may decide not to send the RRCRelease message together with successRAR. In this case upon completion of random access, UE monitors PDCCH addressed to C-RNTI. UL/DL data can be exchanged between UE and gNB until RRCRelease message is received or SDT procedure is terminated.

Figure 3:
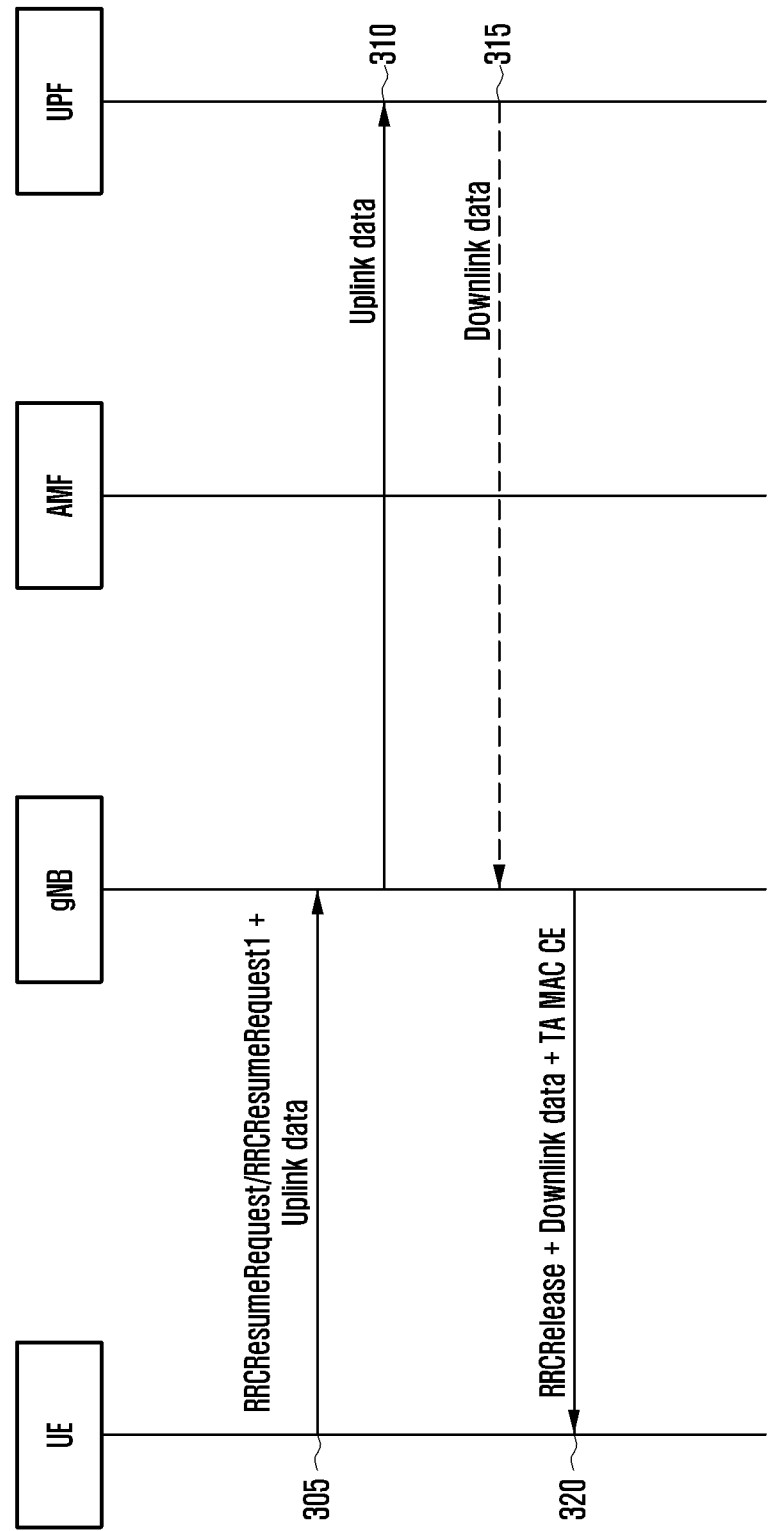
FIG. 3 illustrates another SDT related procedure in accordance with an embodiment of the disclosure.

FIG. 3 illustrates another SDT related procedure in accordance with an embodiment of the disclosure. FIG. 3 shows the signaling flow for small data transmission using preconfigured PUSCH resource.

Criteria to initiate SDT using preconfigured PUSCH resources is met.

In the preconfigured PUSCH resource, the UE sends an RRCResumeRequest/RRCResumeRequest1 to the gNB (same as the last serving GNB) on SRB 0 (305). It includes full/short I-RNTI (resumeIdentity), the resume cause (resumeCause), and an authentication token (resumeMAC-I). The I-RNTI (short or full I-RNTI) is used for context identification and its value shall be the same as the I-RNTI that the UE had received from the last serving gNB in the RRCRelease with suspendConfig message. The ResumeMAC-I is a 16-bit message authentication token, the UE shall calculate it using the integrity algorithm (NIA or EIA) in the stored AS security context, which was negotiated between the UE and the last serving gNB and the KRRCint from the stored AS security context with the following inputs:

KEY: it shall be set to current $K_{RRCint}$;
BEARER: all its bits shall be set to 1.
DIRECTION: its bit shall be set to 1;
COUNT: all its bits shall be set to 1;
MESSAGE: it shall be set to VarResumeMAC-Input with following inputs:
source PCI (set to the physical cell identity of the PCell the UE was connected to prior to suspension of the RRC connection)
target Cell-ID (Set to the cellIdentity of the first PLMN-Identity included in the PLMN-IdentityInfoList broadcasted in SIB1 of the target cell i.e. the cell to which the UE is sending small data)
source C-RNTI (Set to C-RNTI that the UE had in the PCell it was connected to prior to suspension of the RRC connection).

The UE resumes all SRBs and DRBs, derives new security keys using the NextHopChainingCount provided in the RRCRelease message of the previous RRC connection and re-establishes the AS security. The user data are ciphered and integrity protected (Only for DRBs configured with UP integrity protection) and transmitted on DTCH multiplexed with the RRCResumeRequest/RRCResumeRequest1 message on CCCH.

The UE can alternately transmits its small data by using one of the following options:
RRCResumeRequest (or new RRC message). resumeIdentity, ResumeMAC-I, resumeCause, NAS container in RRCResumeRequest/RRCResumeRequest1. NAS container includes UL data.
new MAC CE (resumeIdentity, ResumeMAC-I)+uplink data (on DTCH). resumeIdentity is provided for UE identification purpose. ResumeMAC-I is for security 2. gNB validates the resumeMAC-I and delivers the uplink data to UPF (310).

3. The gNB sends the RRCRelease message to keep the UE in RRC_INACTIVE. The PDCCH is addressed to C-RNTI. The C-RNTI is the one which the UE used in cell from which it received preconfigured PUSCH resources. Alternately, the C-RNTI can be assigned along with preconfigured PUSCH resources. If downlink data is available, they are sent ciphered and integrity protected (Only for DRBs configured with UP integrity protection) on DTCH multiplexed with the RRCRelease message on DCCH (315, 320).

(Alternate 1) We can consider an alternate signaling flow wherein gNB can schedule UL grant (PDCCH addressed to C-RNTI) before RRCRelease. In the UL transmission UE can indicate if it has more data to transmit. If UE has more data to transmit, gNB can schedule UL grant. Otherwise RRCRelease. In the UL transmission, UE can also include SSB ID(s) of SSB above threshold if the SSB indicated by PRACH preamble is no longer suitable.

(Alternate 2) Alternately, gNB can transmit PDCCH addressed to RNTI (i.e. RNTI is the one assigned by gNB along with preconfigured resource, it can be assigned to other UEs as well) and scheduled DL TB includes contention resolution identity (it is first X bits (e.g. 48 bits) of resume message) and C-RNTI. If it matches with UE's contention resolution identity, UE stops the monitoring timer and UE can consider small data transmission as successful.

In the response of the small data transmission, UE can receive a signal (RRC message or DCI) for the following purpose: releasing pre-configured PUSCH or switching to Resume procedure (i.e. RRC_CONNECTED).

Mobility in RRC_INACTIVE in fifth generation wireless communication system: RRC_INACTIVE is a state where a UE remains in CM-CONNECTED and can move within an area configured by NG-RAN (e.g., the RAN notification area (RNA)) without notifying NG-RAN. In RRC_INACTIVE, the last serving gNB node keeps the UE context and the UE-associated NG connection with the serving AMF and UPF.

If the last serving gNB receives DL data from the UPF or DL UE-associated signaling from the AMF (except the UE Context Release Command message) while the UE is in RRC_INACTIVE, it pages in the cells corresponding to the RNA and may send XnAP RAN Paging to neighbor gNB(s) if the RNA includes cells of neighbor gNB(s).

A UE in the RRC_INACTIVE state is required to initiate RNA update procedure when it moves out of the configured RNA. When receiving RNA update request from the UE, the receiving gNB triggers the XnAP Retrieve UE Context procedure to get the UE context from the last serving gNB and may decide to send the UE back to RRC_INACTIVE state, move the UE into RRC_CONNECTED state, or send the UE to RRC_IDLE.

At transition to RRC_INACTIVE the NG-RAN node may configure the UE with a periodic RNA Update timer value (e.g., T380). In case of periodic RNA update, if the last serving gNB decides not to relocate the UE context, it fails the Retrieve UE Context procedure and sends the UE back to RRC_INACTIVE, or to RRC_IDLE directly by an encapsulated RRCRelease message.

UE stops the timer T380 upon reception of RRCSetup message, RRCRelease message, RRCResume message from gNB. If T380 expires, UE initiates RRC Connection resume procedure. During the RRC Connection resume procedure, UE first checks whether access attempt is barred or not. If the access attempt is barred, UE sets the variable pendingRNA-Update to true and starts the timer T390 for UE's access category. If the access attempt is not barred, UE transmits RRCResumeRequest or an RRCResumeRequest1 to gNB with resume cause set to RNA update and sets the variable pendingRNA-Update to false. If RRCReject is received from gNB in response to an RRCResumeRequest or an RRCResumeRequest1, UE sets the variable pendingRNA-Update to true and starts the timer T302. When UE enters RRC_IDLE, set the variable pendingRNA-Update to false, if that is set to true.

If timer T302 expires or is stopped:
    for each Access Category for which T390 is not running: consider the barring for this Access Category to be alleviated:
    else if timer T390 corresponding to an Access Category other than '2' expires or is stopped, and if timer T302 is not running: consider the barring for this Access Category to be alleviated;
    else if timer T390 corresponding to the Access Category '2' expires or is stopped: consider the barring for this Access Category to be alleviated;

When barring is alleviated for Access Category '8' or Access Category '2':
    if upper layers do not request RRC the resumption of an RRC connection, and
    if the variable pendingRNA-Update is set to true:
        UE initiate RRC connection resume procedure with resumeCause value set to ma-Update.

Here, UE in RRC Connected receives RRCRelease with suspend config and CG-SDT resources. UE enters RRC_INACTIVE state. UE starts TAT-SDT (timing alignment timer for SDT). At some point in RRC_INACTIVE state, SDT criteria is met and UE initiate CG-SDT. UE initiate CG-SDT only if cell is not changed and TA is valid (i.e. TAT-SDT is running). While SDT procedure is ongoing, TAT-SDT expires. The issue is the UE behavior upon expiry of TAT-SDT while CG-SDT is ongoing. It is proposed that, UE releases the CG-SDT resources and UE terminates the ongoing SDT procedure. However, this is not efficient as UE has to initiate connection resume procedure upon termination of SDT procedure.

Embodiment 1—Handling TAT-SDT Expiry During the Ongoing SDT Procedure

Embodiment 1-1

UE is in RRC_CONNECTED state.

UE receives RRCRelease message from gNB. RRCRelease message indicates configured grant (CG) resources for SDT.

UE enters RRC_INACTIVE state upon receiving RRCRelease message with suspend configuration.

UE starts timing alignment timer for SDT (i.e., TAT-SDT). The value of timer TAT-SDT is received in RRCRelease message.

While in RRC_INACTIVE state, when data arrives for one or more radio bearer(s) (RB(s)) and criteria to initiate CG-SDT procedure (e.g. RSRP threshold, data volume threshold, etc.) is met, UE initiate the CG-SDT procedure.

While the SDT procedure is ongoing, TAT-SDT expires. Upon initiation of SDT procedure, UE starts SDT timer or SDT error detection timer. In case of CG SDT procedure, this SDT timer or SDT error detection timer can be started upon the first Uplink transmission in CG occasion during the CG-SDT procedure. This SDT timer is stopped upon completion of SDT procedure. In this embodiment of the disclosure, UE operation upon expiry of TAT-SDT while CG-SDT procedure is ongoing is as follows:

UE (i.e. MAC entity in UE) releases the CG-SDT resources (In other words UE (i.e. MAC entity in UE) stops using the CS-SDT resources)

UE checks whether it has received any response from gNB (e.g. hybrid automatic repeat request (HARM) acknowledgement (ACK), or L1-ACK or PDCCH addressed to C-RNTI/SDT-RNTI, or UE has received RRC message or DCCH SDU, or PDCCH addressed to C-RNTI/SDT-RNTI scheduling a new Uplink or downlink transmission, etc.) after the initial UL packet transmission to gNB during the ongoing SDT procedure (Initial UL packet or MAC PDU includes at least RRCResumeRequest/RRCResumeRequest/message. It may additionally include DTCH SDU/DCCH/SDU, BSR. UL packet/MAC PDU is transmitted in CG resource).

If response is received,
    UE does not terminate ongoing SDT procedure
    Suspends UL TX (except RA preamble and MsgA transmission)
    Waits for PDCCH order from gNB
    Upon reception of PDCCH order, UE initiates random access procedure. In an alternate embodiment, instead of waiting for PDCCH order, random access procedure can be initiated by UE. Details of random access procedure are as explained in the background.
    Upon completion of random access procedure, UE resume UL TX During the SDT procedure UE, uses dynamic grant (DG) (i.e. grant allocated to UE using PDCCH addressed to C-RNTI/SDT-RNTI) for SDT Else (i.e. if response is not received)
    UE terminates ongoing SDT procedure. In an embodiment, upon termination, UE enters RRC_IDLE, stop the SDT timer; reset MAC; set the variable pendingRNA-Update to false, if that is set to true; discard the UE Inactive AS context, if any; release the suspendConfig, if configured; discard the $K_{gNB}$ key, the $K_{RRCenc}$ key, the $K_{RRCint}$ key, the $K_{UPint}$ key and the $K_{UPenc}$ key, if any; release all radio resources, including release of the RLC entity, the MAC configuration and the associated PDCP entity and SDAP for all established RBs. In another embodiment, upon termination UE continues in RRC_INACTIVE; stop the SDT timer; reset MAC; set the variable pendingRNA-Update to false, if that is set to true; discard the UE Inactive AS context, if any; release the suspendConfig, if configured; discard the $K_{gNB}$ key, the $K_{RRCenc}$ key, the $K_{RRCint}$ key, the $K_{UPint}$ key and the $K_{UPenc}$ key, if any; suspend SRB1 and radio bearers configured for SDT; in the RRC_INACTIVE, UE may initiate RA-SDT procedure or initiate legacy RRC resume procedure.

Criteria for selecting CG-SDT: CG-SDT criteria is considered met, if all of the following conditions are met,
1) available data volume <=data volume threshold (data volume threshold is signaled by gNB and can be specific to CG-SDT or common for CG-SDT and RA-SDT)
2) RSRP (cell quality or RSRP of path loss reference) is greater than or equal to a configured threshold (threshold is signaled by gNB and can be specific to CG-SDT or common for CG-SDT and RA-SDT)
3) CG-SDT resources are configured on the selected UL carrier and are valid (e.g.
TA is valid (TAT-SDT timer is running), UE's cell is same as the cell from which CG resources are received)
  Selected carrier is the NUL if SUL is not configured in the cell.
  Selected carrier is the NUL if SUL is configured in the cell but CG resources for SDT are not configured for SUL
  Selected carrier is the NUL if SUL is configured in the cell and RSRP is greater than a threshold (threshold is signaled by gNB)
  Selected carrier is the SUL if SUL is configured in the cell and RSRP is not greater than a threshold (threshold is signaled by gNB)
  Selected carrier is the SUL if SUL is configured in the cell but CG resources for SDT are not configured for NUL
  For each UL transmission if CG resource is available in time first for SUL, SUL is selected for that UL transmission. If CG resource is available in time first for NUL, NUL is selected for that UL transmission Embodiment 1-2

UE is in RRC_CONNECTED state.
UE receives RRCRelease message from gNB. RRCRelease message indicates CG resources for SDT.
UE enters RRC_INACTIVE state upon receiving RRCRelease message with suspend configuration.
UE starts timing alignment timer for SDT (i.e. TAT-SDT).
While in RRC_INACTIVE state, when data arrives for one or more RB(s) and criteria to initiate CG-SDT procedure (e.g. RSRP threshold, data volume threshold, etc.) is met, UE initiate the CG-SDT procedure.
While the SDT procedure is ongoing, TAT-SDT expires. In this embodiment of the disclosure, UE operation upon expiry of TAT-SDT while CG-SDT procedure is ongoing is as follows:
  UE (i.e. MAC entity in UE) do not release the CG-SDT resources. MAC entity in UE continue to use the CG-SDT resources.
  UE checks whether it has received any response (e.g. HARQ ACK, or L1-ACK or PDCCH addressed to C-RNTI/SDT-RNTI, or UE has received RRC message or DCCH SDU, or PDCCH addressed to C-RNTI/SDT-RNTI scheduling a new Uplink or downlink transmission, etc.) after the initial UL packet transmission to gNB during the ongoing SDT procedure (Initial UL packet or MAC PDU includes at least RRCResumeRequest/RRCResumeRequest/message. It may additionally include DTCH SDU/DCCH/SDU, BSR. UL packet/MAC PDU is transmitted in CG resource).
  If response is received,
    UE does not terminates ongoing SDT procedure
    Suspend UL TX (except RACH transmission)
    Wait for PDCCH order from gNB
    Upon reception of PDCCH order, UE initiate random access procedure. In an alternate embodiment, instead of waiting for PDCCH order, random access procedure can be initiated by UE
    Upon completion of random access procedure, UE resume UL TX
    During the SDT procedure UE, uses DG (i.e. grant allocated to UE using PDCCH addressed to C-RNTI/SDT-RNTI) for SDT. UE also uses CG resources for SDT.
  Else (i.e. if response is not received)
    UE terminates ongoing SDT procedure. In an embodiment, upon termination, UE enters RRC_IDLE, stop the SDT timer; reset MAC; set the variable pendingRNA-Update to false, if that is set to true; discard the UE Inactive AS context, if any; release the suspendConfig, if configured; discard the $K_{gNB}$ key, the $K_{RRCenc}$ key, the $K_{RRCint}$ key, the $K_{UPint}$ key and the $K_{UPenc}$ key, if any; release all radio resources, including release of the RLC entity, the MAC configuration and the associated PDCP entity and SDAP for all established RBs. In another embodiment, upon termination UE continues in RRC_INACTIVE; stop the SDT timer; reset MAC; set the variable pendingRNA-Update to false, if that is set to true; discard the UE Inactive AS context, if any; release the suspendConfig, if configured; discard the $K_{gNB}$ key, the $K_{RRCenc}$ key, the $K_{RRCint}$ key, the $K_{UPint}$ key and the $K_{UPenc}$ key, if any; suspend SRB1 and radio bearers configured for SDT; in the RRC_INACTIVE, UE may initiate RA-SDT procedure or initiate legacy RRC resume procedure.
Criteria for selecting CG-SDT: CG-SDT criteria is considered met, if all of the following conditions are met,
1) available data volume <=data volume threshold (data volume threshold is signaled by gNB and can be specific to CG-SDT or common for CG-SDT and RA-SDT)
2) RSRP (cell quality or RSRP of path loss reference) is greater than or equal to a configured threshold (threshold is signaled by gNB and can be specific to CG-SDT or common for CG-SDT and RA-SDT)
3) CG-SDT resources are configured on the selected UL carrier and are valid (e.g. TA is valid (TAT-SDT timer is running), UE's cell is same as the cell from which CG resources are received)
  Selected carrier is the NUL if SUL is not configured in the cell.
  Selected carrier is the NUL if SUL is configured in the cell but CG resources for SDT are not configured for SUL
  Selected carrier is the NUL if SUL is configured in the cell and RSRP is greater than a threshold (threshold is signaled by gNB)
  Selected carrier is the SUL if SUL is configured in the cell and RSRP is not greater than a threshold (threshold is signaled by gNB)
  Selected carrier is the SUL if SUL is configured in the cell but CG resources for SDT are not configured for NUL
  For each UL transmission if CG resource is available in time first for SUL, SUL is selected for that UL transmission. If CG resource is available in time first for NUL, NUL is selected for that UL transmission Embodiment 2—TAT Timer Maintenance Embodiment 2-1

UE is in RRC_CONNECTED state. First TAT timer (TAT-non SDT) is running for UL timing maintenance. This timer is maintained separately for each timing advanced group. UE can be configured with multiple timing advance groups where each group consists of one or more serving cells.

UE receives RRCRelease message from gNB. RRCRelease message indicates CG resources for SDT and includes configuration of second TAT timer. The second TAT timer (i.e. TAT-SDT) is for TA validation for SDT.

UE enters RRC_INACTIVE state upon receiving RRCRelease message with suspend configuration. UE stops the first TAT timer (s).

UE starts second TAT timer (i.e. TAT-SDT). In an embodiment, TAT-SDT can be configured in RRCReconfiguration message (not in RRCRelease message) in RRC connected, and once configured, UE (re)starts the TAT-SDT whenever it receives TAC (either from RA or TAC MAC CE) from gNB, except a TAC during SI request. Alternatively, TAT-SDT can be configured in RRCRelease message, but the value of TAT-SDT is set to the "currently remaining" value for first TAT timer when it enters to RRC_INACTIVE.

While the UE is in RRC_INACTIVE state, random access procedure is initiated. For example, it can be initiated for Msg1 based SI request or Msg3 based SI request or for connection resume, for RNA update, etc.

During the RA procedure, UE receives timing advance command from gNB in random access response or in MsgB.

Upon reception of timing advance command from gNB in random access response or in MsgB Upon:
  UE starts the first TAT timer (first TAT timer for associated TAG, which is PTAG in RRC_INACTIVE)
  UE does not re-start the second TAT timer.

During the random access procedure when the contention Resolution is considered successful, UE checks whether random access procedure was initiated for SI request or not.

If the random access procedure was initiated for SI request, after transmitting HARQ feedback for MAC PDU including UE Contention Resolution Identity MAC CE:
  UE stops the first TAT timer
  Else If random access procedure was not initiated for SI request
  UE re-start second TAT timer Alternately, upon successful completion of Random access procedure, UE checks whether random access procedure was initiated for SI request or not. If random access procedure was not initiated for SI request, UE re-start second TAT timer. Otherwise not.

Embodiment 2-2

UE is in RRC_CONNECTED state. First TAT timer (i.e., TAT-non SDT) is running for UL timing maintenance. This TAT-non SDT timer is maintained separately for each timing advanced group. UE can be configured with multiple timing advance groups where each group consists of one or more serving cells.

UE receives RRCRelease message from gNB. RRCRelease message indicates CG resources for SDT and includes configuration of second TAT timer. The second TAT timer (i.e., TAT-SDT) is for TA validation for SDT.

UE enters RRC_INACTIVE state upon receiving RRCRelease message with suspend configuration. UE stops the first TAT timer (s).

UE starts second TAT timer (i.e. TAT-SDT). In an embodiment, TAT-SDT can be configured in RRCReconfiguration message (not in RRCRelease message) in RRC connected, and once configured, UE (re)starts the TAT-SDT whenever it receives TAC (either from RA or TAC MAC CE) from gNB, except a TAC during SI request. Alternatively, TAT-SDT can be configured in RRCRelease message, but the value of TAT-SDT is set to the "currently remaining" value for first TAT timer when it enters to RRC_INACTIVE.

While the UE is in RRC_INACTIVE state, random access procedure is initiated. For example, it can be initiated for Msg1 based SI request or Msg3 based SI request or for connection resume, for RNA update, etc.

During the random access procedure when the contention Resolution is considered successful, UE checks whether random access procedure was initiated for SI request or not.

If the random access procedure was initiated for SI request, after transmitting HARQ feedback for MAC PDU including UE Contention Resolution Identity MAC CE
  UE stops the first TAT timer
  If UE receives fallbackRAR during the random access procedure (this occurs if random access procedure is 2 step RA procedure)
    start the first TAT timer upon reception of fallbackRAR.
    the second TAT timer is re-started upon successful completion of random access procedure
  If UE receives successRAR during the random access procedure (this occurs if random access procedure is 2 step RA procedure)
    start the first TAT timer upon reception of successRAR.
    the second TAT timer is re-started upon successful completion of random access procedure
  If UE receives RAR during the random access procedure (this occurs if random access procedure is 4 step RA procedure)
    UE checks whether this RA is initiated for SI request or not
    If RA procedure is not initiated for SI request, the second TAT timer is re-started upon successful completion of random access procedure Embodiment 2-3

UE is in RRC_CONNECTED state. First TAT timer (i.e., TAT-non SDT) is running for UL timing maintenance. This timer is maintained separately for each timing advanced group. UE can be configured with multiple timing advance groups where each group consists of one or more serving cells.

UE receives RRCRelease message from gNB. RRCRelease message indicates CG resources for SDT and includes configuration of second TAT timer. The second TAT timer (i.e., TAT-SDT) is for TA validation for SDT.

UE enters RRC_INACTIVE state upon receiving RRCRelease message with suspend configuration. UE stops the first TAT timer (s).

UE starts second TAT timer (i.e. TAT-SDT). In an embodiment, TAT-SDT can be configured in RRCReconfiguration message (which is not in RRCRelease message) in RRC connected, and once configured, UE (re)starts the TAT-SDT whenever it receives timing advance command (TAC) (either from RA or TAC MAC CE) from gNB, except a TAC during SI request. Alternatively, TAT-SDT can be configured in RRCRelease message, but the value of TAT-SDT is set to the "currently remaining" value for first TAT timer when it enters to RRC_INACTIVE.

While the UE is in RRC_INACTIVE state, random access procedure is initiated. For example, it can be initiated for Msg1 based SI request or Msg3 based SI request or for connection resume, for RNA update, etc.

During the random access procedure when the contention Resolution is considered successful, UE checks whether random access procedure was initiated for SI request or not.

If the random access procedure was initiated for SI request, after transmitting HARQ feedback for MAC PDU including UE Contention Resolution Identity MAC CE
    UE stops the first TAT timer
If UE receives random access response (or receives timing advance command from gNB in random access response) and random access procedure is a 2 step random access procedure
    start the first TAT timer upon reception of random access response
    the second TAT timer is re-started upon successful completion of random access procedure
If UE receives random access response (or receives timing advance command from gNB in random access response) and random access procedure is a 4 step random access procedure
    UE checks whether this RA is initiated for SI request or not
    If RA procedure is not initiated for SI request, the second TAT timer is re-started upon successful completion of random access procedure

Embodiment 3—CG-SDT Trigger

UE is in RRC_CONNECTED state.

UE receives RRCRelease message from gNB. RRCRelease message indicates CG resources for SDT.

UE enters RRC_INACTIVE state upon receiving RRCRelease message with suspend configuration and includes configuration of timing alignment timer for SDT (i.e. TAT-SDT).

UE starts timing alignment timer for SDT (i.e. TAT-SDT). In an embodiment, TAT-SDT can be configured in RRCReconfiguration message (not in RRCRelease message) in RRC connected, and once configured, UE (re)starts the TAT-SDT whenever it receives TAC (either from RA or TAC MAC CE) from gNB, except a TAC during SI request. Alternatively, TAT-SDT can be configured in RRCRelease message, but the value of TAT-SDT is set to the "currently remaining" value for first TAT timer when it enters to RRC_INACTIVE.

While the UE is in RRC_INACTIVE state, data arrives for one or more RB(s) for which SDT is enabled
    UE checks the remaining time for TAT-SDT (i.e. time after which TAT-SDT will expire)
    If remaining time<threshold (threshold can be signaled by gNB in RRCRelease or System information or in RRCReconfiguration message or can be pre-defined) or in another embodiment, if remaining time is less than the time until the first available CG occasion for SDT (or first available valid CG occasion for SDT or first available CG occasion for SDT corresponding to a SSB with SS-RSRP above threshold)
        UE does not trigger CG-SDT (UE may perform RA-SDT in this case if RA-SDT criteria is met. Otherwise RRC connection resume procedure is performed)
    Else
        UE trigger CG-SDT if all other criteria as listed are met (in alternate embodiments a subset of these criteria can be applied)
        1) available data volume <=data volume threshold (data volume threshold is signaled by gNB and can be specific to CG-SDT or common for CG-SDT and RA-SDT)
        2) RSRP (cell quality or RSRP of path loss reference) is greater than or equal to a configured threshold (threshold is signaled by gNB and can be specific to CG-SDT or common for CG-SDT and RA-SDT)
        3) CG-SDT resources are configured on the selected UL carrier and are valid (e.g. TA is valid (TAT-SDT timer is running), UE's cell is same as the cell from which CG resources are received):
            Selected carrier is the NUL if SUL is not configured in the cell.
            Selected carrier is the NUL if SUL is configured in the cell but CG resources for SDT are not configured for SUL
            Selected carrier is the NUL if SUL is configured in the cell and RSRP is greater than a threshold (threshold is signaled by gNB)
            Selected carrier is the SUL if SUL is configured in the cell and RSRP is not greater than a threshold (threshold is signaled by gNB)
            Selected carrier is the SUL if SUL is configured in the cell but CG resources for SDT are not configured for NUL
            For each UL transmission if CG resource is available in time first for SUL, SUL is selected for that UL transmission. If CG resource is available in time first for NUL, NUL is selected for that UL transmission Criteria for selecting RA-SDT: RA-SDT criteria is considered met, if all of the following conditions are met
    1) available data volume <=data volume threshold (data volume threshold is signaled by gNB and can be specific to CG-SDT or common for CG-SDT and RA-SDT).
    2) RSRP is greater than or equal to a configured threshold (threshold is signaled by gNB and can be specific to CG-SDT or common for CG-SDT and RA-SDT)
    3) 4 step RA-SDT resources are configured on the selected UL carrier and criteria to select 4 step RA SDT is met; or
    3) 2 step RA-SDT resources are configured on the selected UL carrier and criteria to select 2 step RA SDT is met:

Note:
    UE checks the condition 1) and 2) before UL carrier selection and RA-Type selection.
    For RA-SDT, if SUL is configured in the cell, UL carrier is selected based on RSRP threshold (threshold is signaled by gNB and can be specific to CG-SDT or common for CG-SDT and RA-SDT)

RA type (2 step or 4 step) selection is performed based on RSRP threshold (threshold is signaled by gNB and can be same for SDT and non SDT RACH) as explained earlier in this disclosure.

Hereinafter, a scenario regarding another embodiment is described in detail.

UE is in RRC_INACTIVE state. NAS triggers RRC to resume RRC Connection.

RRC initiates resume procedure for resuming RRC Connection.
    UE applies the default SRB1 configuration; applies the default MAC cell group configuration; applies the CCCH configuration; re-establishes PDCP entity for SRB1; resumes SRB1.
    RRC generates 1st RRC Resume Request with resume cause set to Mo-data and is stored in CCCH buffer for transmission.
    While the RRC connection resumption is ongoing, T380 expires/RAN paging is received.

According to current procedure, upon T380 expiry/upon RAN paging reception, UE initiates resume procedure again.

UE applies the default SRB1 configuration; applies the default MAC cell group configuration; applies the CCCH configuration.

UE re-establishes PDCP entity for SRB1; resumes SRB1.

RRC generates 2nd RRC Resume Request with resume cause set to MT-data/ran-update and is stored in CCCH buffer for transmission.

Here, CCCH buffer includes 1st and 2nd RRC Resume request and will be delivered one after another.

1st RRC resume request is received by gNB. GNB sends RRC Resume for the 1st RRC resume request and UE receives the RRC resume. GNB then receives the 2nd RRC resume request.

GNB behavior is unpredictable upon receiving the 2nd RRC resume request: it may ignore the 2nd resume request message as it is expecting resume complete message from UE. Alternately, it may cancel the first RRC resume and send a new RRC Resume message in response to 2nd RRC resume request.

UE may have already received the resume message and entered RRC connected, so upon receiving a new RRC resume message, UE may ignore the RRC resume message. As a result, gNB and UE may not be in sync with respect to resumption procedure. So an enhanced method is needed.

Hereinafter, another scenario regarding another embodiment is described in detail.

UE is in RRC Connected. UE receives RRCRelease with suspend config and CG-SDT resources.

UE enters RRC_INACTIVE state.

GNB wants to release CG-SDT resources configured to UEs.

GNB transmits paging message wherein the paging message includes SI update notification in SI modification period X.

GNB updates value tag for SIB 2 in SIB1 and transmits updated SIB1 in modification period X+1.

GNB includes CG-SDT-Release indication in SIB 2 and transmit SIB 2 in SI modification period X+1.

Upon receiving SI update notification in paging message in SI modification period X, UE acquires MIB, SIB1 in SI modification period X+1. UE also acquires SIB2 as the value tag for SIB2 is updated in SIB 1.

If SIB2 includes CG-SDT-Release indication, UE releases the CG-SDT resources.

Here, 1) Upon receiving SI update notification in paging message, all the UEs in cell need to acquire MIB, SIB1 and SIB2 even if they are not configured with CG-SDT resources.

Also, 2) How to handle ongoing SDT procedure upon receiving CG-SDT resource release via SI

Embodiment 4—Handling T380 Expiry/RAN Paging while Connection Resume is Ongoing

Embodiment 4-1

UE is in RRC_CONNECTED state. UE receives RRCRelease message from gNB, wherein the RRCRelease message includes suspend configuration. Value of timer T380 is also configured in the received RRCRelease message. Suspend configuration includes full I-RNTI.

UE enters RRC_INACTIVE state as the received RRCRelease message includes suspend configuration. UE also starts the timer T380 as the value of timer T380 is included in the received RRCRelease message.

If T380 expires, UE performs the following operation:

UE checks whether RRC connection resume is ongoing or not (i.e. if the timer T319 or SDT timer is running or not; note that timer T319 is running if RRC connection resume for non SDT is ongoing and SDT timer is running if RRC connection resume for SDT is ongoing)

If RRC connection resume is ongoing (i.e. either T319 or SDT is running):
　Reset MAC (or reset MAC and release the MAC configuration). The operations related to MAC reset are listed later in this disclosure.
　Release RLC entity for SRB 0 or re-establish RLC entity for SRB 0
(Alternatives):
　re-establish RLC for all RBs that are established; or
　release the RLC entity and the associated PDCP entity and SDAP for all established RBs; or
　release RLC entity for SRB 0 or discard all contents in RLC entity for SRB 0; or
　release the RLC entity and the associated PDCP entity and SDAP for SRB 0;
Note that SRB 0 can also be referred as CCCH.
　initiate the RRC connection resumption procedure with resumeCause set to rna-Update
Else (i.e. if RRC connection resumption is not ongoing)
　initiate the RRC connection resumption procedure with resumeCause set to rna-Update If RAN paging is received while the UE is in RRC_INACTIVE state (i.e. in the RRC_INACTIVE state, UE receives paging message and UE identity in the paging message matches the UE's stored full I-RNTI), UE performs the following operation:

UE checks whether RRC connection resume is ongoing or not (i.e. if the timer T319 or SDT timer is running or not; note that timer T319 is running if RRC connection resume for non SDT is ongoing and SDT timer is running if RRC connection resume for SDT is ongoing)

If RRC connection resume is ongoing (i.e. either T319 or SDT is running):
　Reset MAC (or reset MAC and release the MAC configuration)
　Release RLC entity for SRB 0 or re-establish RLC entity for SRB 0
(Alternatives):
　re-establish RLC for all RBs that are established; or
　release the RLC entity and the associated PDCP entity and SDAP for all established RBs; or
　release RLC entity for SRB 0 or discard all contents in RLC entity for SRB 0; or
　release the RLC entity and the associated PDCP entity and SDAP for SRB 0;
Note that SRB 0 can also be referred as CCCH.
　if the UE is configured by upper layers with Access Identity 1:
　　initiate the RRC connection resumption procedure with resumeCause set to mps-PriorityAccess;
　else if the UE is configured by upper layers with Access Identity 2:
　　initiate the RRC connection resumption procedure with resumeCause set to mcs-PriorityAccess;
　else if the UE is configured by upper layers with one or more Access Identities equal to 11-15:
　　initiate the RRC connection resumption procedure with resumeCause set to highPriorityAccess;

else:
   the RRC connection resumption procedure with resumeCause set to mt-Access;
Else (i.e. if RRC connection resumption is not ongoing)
  if the UE is configured by upper layers with Access Identity 1:
    the RRC connection resumption procedure with resumeCause set to mps-PriorityAccess;
  else if the UE is configured by upper layers with Access Identity 2:
    initiate the RRC connection resumption procedure with resumeCause set to mcs-PriorityAccess;
  else if the UE is configured by upper layers with one or more Access Identities equal to 11-15:
    initiate the RRC connection resumption procedure with resumeCause set to highPriorityAccess;
  else:
    initiate the RRC connection resumption procedure with resumeCause set to mt-Access;

Note that in an embodiment, the following operation in the above description can be included as part of RRC connection resumption procedure.

Reset MAC (or reset MAC and release the MAC configuration)
Release RLC entity for SRB 0 or re-establish RLC entity for SRB 0
(Alternatives):
re-establish RLC for all RBs that are established; or
release the RLC entity and the associated PDCP entity and SDAP for all established RBs; or
release RLC entity for SRB 0 or discard all contents in RLC entity for SRB 0; or
release the RLC entity and the associated PDCP entity and SDAP for SRB 0;
Note that SRB 0 can also be referred as CCCH.
MAC Reset operations:
If a reset of the MAC entity is requested, the MAC entity shall:
1> initialize Bj for each logical channel to zero;
1> initialize SBj for each logical channel to zero if Sidelink resource allocation mode 1 is configured by RRC;
1> stop (if running) all timers;
1> consider all timeAlignmentTimers as expired;
1> set the NDIs for all uplink HARQ processes to the value 0;
1> sets the NDIs for all HARQ process IDs to the value 0 for monitoring PDCCH in Sidelink resource allocation mode 1;
1> stop, if any, ongoing Random Access procedure;
1> discard explicitly signaled contention-free Random Access Resources for 4-step RA type and 2-step RA type, if any;
1> flush Msg3 buffer;
1> flush MSGA buffer;
1> cancel, if any, triggered Scheduling Request procedure;
1> cancel, if any, triggered Buffer Status Reporting procedure;
1> cancel, if any, triggered Power Headroom Reporting procedure;
1> cancel, if any, triggered consistent LBT failure;
1> cancel, if any, triggered BFR;
1> cancel, if any, triggered Sidelink Buffer Status Reporting procedure;
1> cancel, if any, triggered Pre-emptive Buffer Status Reporting procedure;
1> flush the soft buffers for all DL HARQ processes;
1> for each DL HARQ process, consider the next received transmission for a TB as the very first transmission;
1> release, if any, Temporary C-RNTI;
1> reset all BFI_COUNTERs;
1> reset all LBT_COUNTERs.

Figure 4:
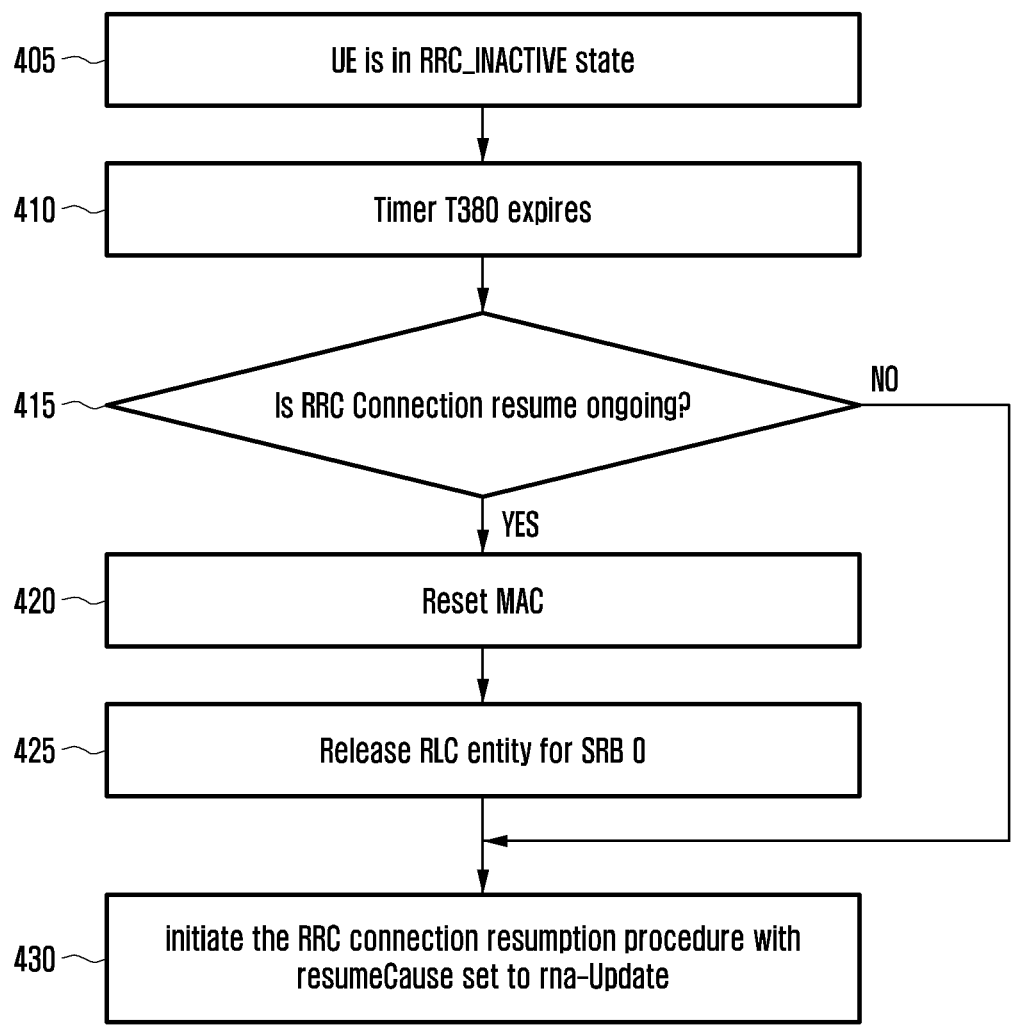
FIG. 4 illustrates a timer handling procedure according to an embodiment of the disclosure.

FIG. 4 illustrates a timer handling procedure according to an embodiment of the disclosure. FIG. 4 shows an example illustration of UE operation for handling expiry of timer T380 in RRC_INACTIVE according to the embodiment 4-1 in this disclosure.

In FIG. 4, UE is in RRC_INACTIVE state (405). When Timer T380 expires (410) and RRC connection resume is ongoing (415), UE resets MAC (420). UE releases RLC entity for SRB0 (425). UE initiates the RRC connection resumption procedure with resumeCause set to ma-Update (430). When Timer T380 expires and RRC connection resume is not ongoing (415), UE initiates the RRC connection resumption procedure with resumeCause set to ma-Update (430) without resetting MAC and releasing RLC entity for SRB0.

Figure 5:
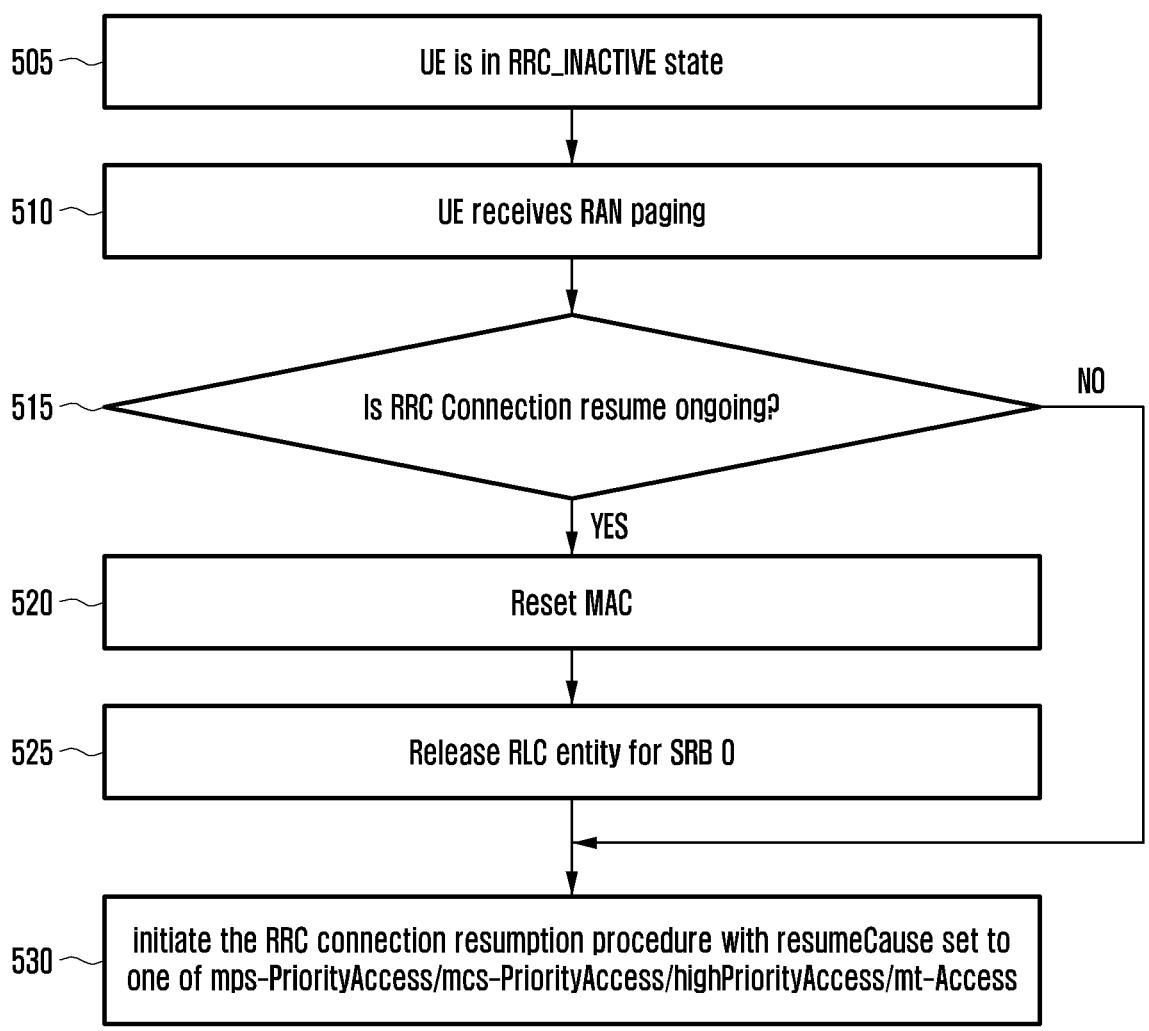
FIG. 5 illustrates a radio access node (RAN) paging procedure according to an embodiment of the disclosure.

FIG. 5 illustrates a radio access node (RAN) paging procedure according to an embodiment of the disclosure. FIG. 5 shows an example illustration of UE operation for handling RAN paging in RRC_INACTIVE according to the embodiment 4-1 in this disclosure.

In FIG. 5, UE is in RRC_INACTIVE state (505). When UE received RAN paging (510) and RRC connection resume is ongoing (515), UE resets MAC (520). UE releases RLC entity for SRB0 (525). UE initiates the RRC connection resumption procedure with resumeCause set to one of mps-PriorityAccess/mcs-PriorityAccess/highPriorityAccess/mt-Access (530). When Timer T380 expires and RRC connection resume is not ongoing (515), UE initiates the RRC connection resumption procedure with resumeCause set to set to one of mpsPriorityAccess/mcs-PriorityAccess/highPriorityAccess/mt-Access (530) without resetting MAC and releasing RLC entity for SRB0.

Embodiment 4-2

UE is in RRC_CONNECTED state. UE receives RRCRelease message from gNB, wherein the RRCRelease message includes suspend configuration. Value of timer T380 is also configured in the received RRCRelease message. Suspend configuration includes full I-RNTI.

UE enters RRC_INACTIVE state as the received RRCRelease message includes suspend configuration. UE also starts the timer T380 as the value of timer T380 is included in the received RRCRelease message.

If T380 expires, UE performs the following operation:
1> initiate the RRC connection resumption procedure with resumeCause set to rna-Update
1> if an emergency service is ongoing:
2> select '2' as the Access Category;
2> set the resumeCause to emergency;
1> else:
2> select '8' as the Access Category;
1> perform the unified access control procedure using the selected Access Category
2> if the access attempt is barred:
2> set the variable pendingRNA-Update to true;
2> the procedure ends;
1> if the UE is in NE-DC or NR-DC:
2> if the UE does not support maintaining SCG configuration upon connection resumption:

3> release the MR-DC related configurations from the UE Inactive AS context, if stored;
1> if the UE does not support maintaining the MCG SCell configurations upon connection resumption:
2> release the MCG SCell(s) from the UE Inactive AS context, if stored;
1> Reset MAC (or reset MAC and release the MAC configuration). The operations related to MAC reset are as listed in embodiment 4-1.
1> Release RLC entity for SRB 0 or re-establish RLC entity for SRB 0.
(Alternatives):
re-establish RLC for all RBs that are established; or
release the RLC entity and the associated PDCP entity and SDAP for all established RBs; or
release RLC entity for SRB 0 or discard all contents in RLC entity for SRB 0; or
release the RLC entity and the associated PDCP entity and SDAP for SRB 0;
Note that SRB 0 can also be referred as CCCH.
1> apply the default L1 parameter values as specified in corresponding physical layer specifications, except for the parameters for which values are provided in SIB1;
1> apply the default SRB1 configuration;
1> apply the default MAC Cell Group configuration;
1> release delayBudgetReportingConfig from the UE Inactive AS context, if stored;
1> stop timer T342, if running;
1> release overheatingAssistanceConfig from the UE Inactive AS context, if stored;
1> stop timer T345, if running;
1> release idc-AssistanceConfig from the UE Inactive AS context, if stored;
1> release drx-PreferenceConfig for all configured cell groups from the UE Inactive AS context, if stored;
1> stop all instances of timer T346a, if running;
1> release maxBW-PreferenceConfig for all configured cell groups from the UE Inactive AS context, if stored;
1> stop all instances of timer T346b, if running;
1> release maxCC-PreferenceConfig for all configured cell groups from the UE
Inactive AS context, if stored;
1> stop all instances of timer T346c, if running;
1> release maxMIMO-LayerPreferenceConfig for all configured cell groups from the
UE Inactive AS context, if stored;
1> stop all instances of timer T346d, if running;
1> release minSchedulingOffsetPreferenceConfig for all configured cell groups from the UE Inactive AS context, if stored;
1> stop all instances of timer T346e, if running;
1> release releasePreferenceConfig from the UE Inactive AS context, if stored;
1> stop timer T346f, if running;
1> apply the CCCH configuration;
1> apply the timeAlignmentTimerCommon included in SIB1;
1> start timer T319;
1> set the variable pendingRNA-Update to false;
If RAN paging is received while the UE is in RRC_INACTIVE state (i.e. in the RRC_INACTIVE state, UE receives paging message and UE identity in the paging message matches the UE's stored full I-RNTI), UE performs the following operation:

1> if the UE is configured by upper layers with Access Identity 1:
initiate the RRC connection resumption procedure with resumeCause set to mpsPriorityAccess;
1> else if the UE is configured by upper layers with Access Identity 2:
initiate the RRC connection resumption procedure with resumeCause set to mcs-PriorityAccess;
1> else if the UE is configured by upper layers with one or more Access Identities equal to 11-15:
initiate the RRC connection resumption procedure with resumeCause set to highPriorityAccess;
else:
initiate the RRC connection resumption procedure with resumeCause set to mt-Access;
1> select '0' as the Access Category;
1> perform the unified access control procedure using the selected Access Category and one or more Access Identities provided by upper layers;
2> if the access attempt is barred, the procedure ends;
1> if the UE is in NE-DC or NR-DC:
2> if the UE does not support maintaining SCG configuration upon connection resumption:
3> release the MR-DC related configurations from the UE Inactive AS context, if stored;
1> if the UE does not support maintaining the MCG SCell configurations upon connection resumption:
2> release the MCG SCell(s) from the UE Inactive AS context, if stored;
1> Reset MAC (or reset MAC and release the MAC configuration). The operations related to MAC reset are as listed in embodiment 4-1.
1> Release RLC entity for SRB 0 or re-establish RLC entity for SRB 0.
(Alternatives):
re-establish RLC for all RBs that are established; or
release the RLC entity and the associated PDCP entity and SDAP for all established RBs; or
release RLC entity for SRB 0 or discard all contents in RLC entity for SRB 0; or
release the RLC entity and the associated PDCP entity and SDAP for SRB 0;
Note that SRB 0 can also be referred as CCCH.
1> apply the default L1 parameter values as specified in corresponding physical layer specifications, except for the parameters for which values are provided in SIB1;
1> apply the default SRB1 configuration;
1> apply the default MAC Cell Group configuration;
1> release delayBudgetReportingConfig from the UE Inactive AS context, if stored;
1> stop timer T342, if running;
1> release overheatingAssistanceConfig from the UE Inactive AS context, if stored;
1> stop timer T345, if running;
1> release idc-AssistanceConfig from the UE Inactive AS context, if stored;
1> release drx-PreferenceConfig for all configured cell groups from the UE Inactive AS context, if stored;
1> stop all instances of timer T346a, if running;
1> release maxBW-PreferenceConfig for all configured cell groups from the UE Inactive AS context, if stored;
1> stop all instances of timer T346b, if running;
1> release maxCC-PreferenceConfig for all configured cell groups from the UE Inactive AS context, if stored;
1> stop all instances of timer T346c, if running;

1> release maxMIMO-LayerPreferenceConfig for all configured cell groups from the UE Inactive AS context, if stored;
1> stop all instances of timer T346d, if running;
1> release minSchedulingOffsetPreferenceConfig for all configured cell groups from the UE Inactive AS context, if stored;
1> stop all instances of timer T346e, if running;
1> release releasePreferenceConfig from the UE Inactive AS context, if stored;
1> stop timer T346f, if running;
1> apply the CCCH configuration;
1> apply the timeAlignmentTimerCommon included in SIB1;
1> start timer T319;
1> set the variable pendingRNA-Update to false;

Embodiment 4-3

UE is in RRC_CONNECTED state. UE receives RRCRelease message from gNB, wherein the RRCRelease message includes suspend configuration. Value of timer T380 is also configured in the received RRCRelease message. Suspend configuration includes full I-RNTI.

UE enters RRC_INACTIVE state as the received RRCRelease message includes suspend configuration. UE also starts the timer T380 as the value of timer T380 is included in the received RRCRelease message.

Figure 6:
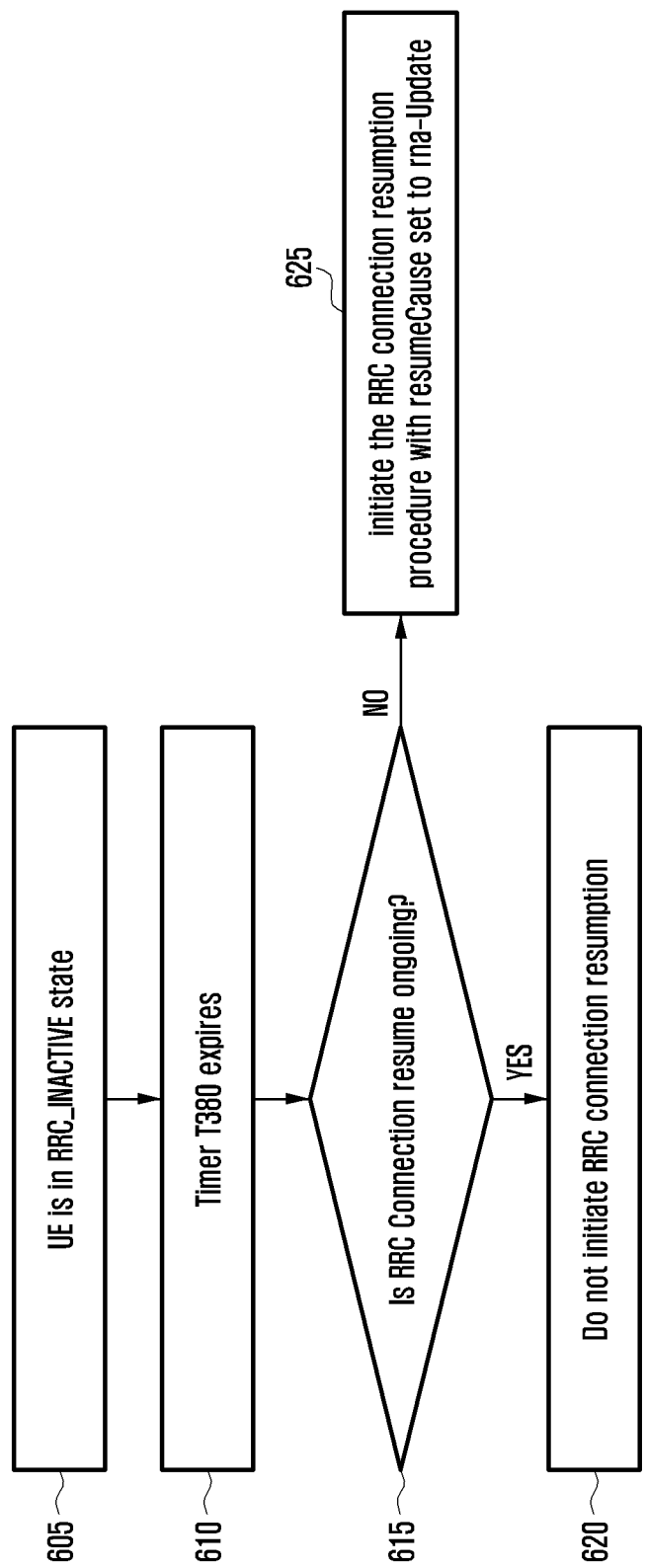
FIG. 6 illustrates another timer handling procedure according to another embodiment of the disclosure.

If T380 expires, UE performs the following operation:
UE checks whether RRC connection resume is ongoing or not
If RRC connection resume is ongoing:
    do not initiate the RRC connection resumption procedure
Else (i.e. if RRC connection resumption is not ongoing)
    initiate the RRC connection resumption procedure with resumeCause set to rna-Update
If RAN paging is received while the UE is in RRC_INACTIVE state (i.e. in the RRC_INACTIVE state, UE receives paging message and UE identity in the paging message matches the UE's stored full I-RNTI), UE performs the following operation:
UE checks whether RRC connection resume is ongoing or not
If RRC connection resume is ongoing:
    do not initiate the RRC connection resumption procedure
Else (i.e. if RRC connection resumption is not ongoing)
    if the UE is configured by upper layers with Access Identity 1:
        initiate the RRC connection resumption procedure with resumeCause set to mps-PriorityAccess;
    else if the UE is configured by upper layers with Access Identity 2:
        initiate the RRC connection resumption procedure with resumeCause set to mcs-PriorityAccess;
    else if the UE is configured by upper layers with one or more Access Identities equal to 11-15:
        initiate the RRC connection resumption procedure with resumeCause set to highPriorityAccess;
    else:
        initiate the RRC connection resumption procedure with resumeCause set to mt-Access;

FIG. 6 illustrates another timer handling procedure according to another embodiment of the disclosure. FIG. 6 shows an example illustration of UE operation for handling expiry of timer T380 in RRC_INACTIVE according to the embodiment 4-3 in this disclosure.

In FIG. 6, UE is in RRC_INACTIVE state (605). When timer T380 expires (610) and RRC connection resume is ongoing (615), UE does not initiate RRC connection resumption (620). When timer T380 expires and RRC connection resume is not ongoing (615), UE initiates the RRC connection resumption procedure with resumeCause set to ma-Update (625).

Figure 7:
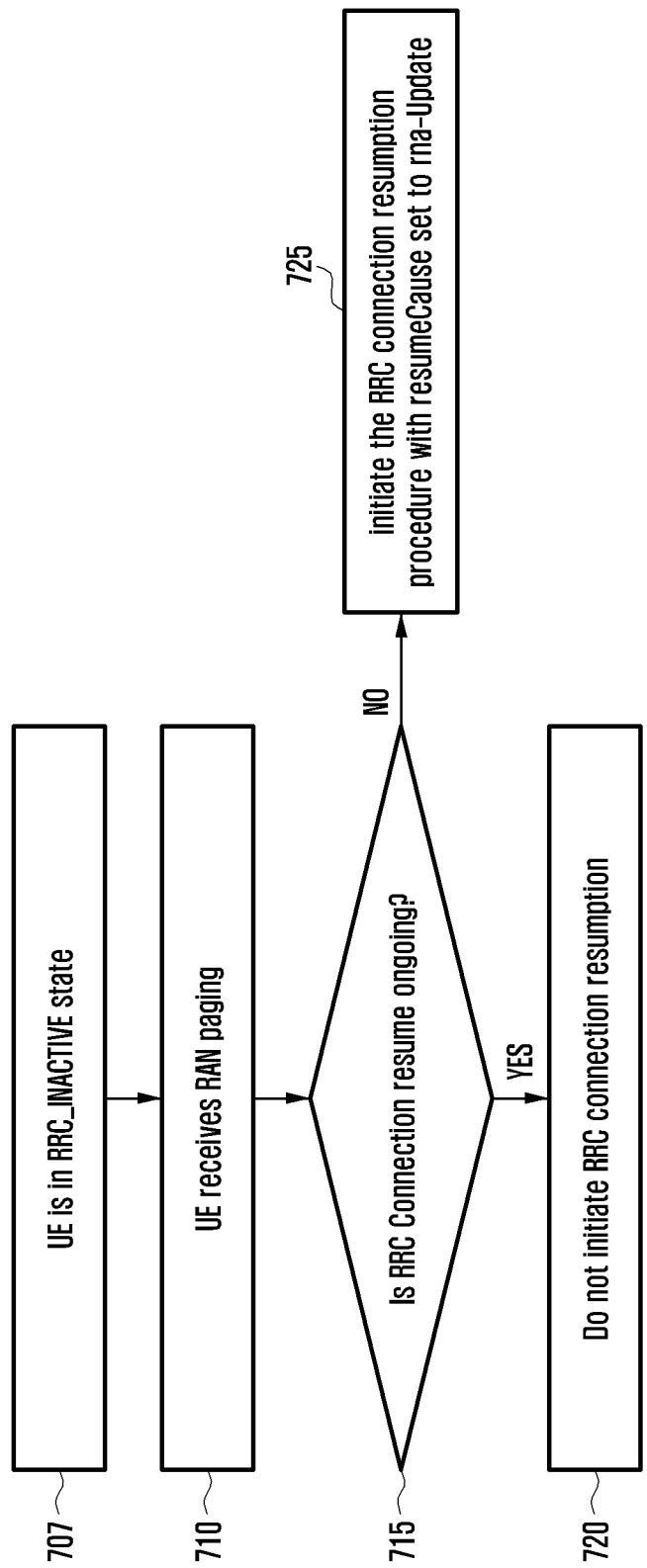
FIG. 7 illustrates another RAN paging procedure according to another embodiment of the disclosure.

FIG. 7 illustrates another RAN paging procedure according to another embodiment of the disclosure. FIG. 7 shows an example illustration of UE operation for handling RAN paging in RRC_INACTIVE according to the embodiment 4-3 in this disclosure.

In FIG. 7, UE is in RRC_INACTIVE state (705). When UE receives RAN paging (710) and RRC connection resume is ongoing (715), UE does not initiate RRC connection resumption (720). When UE receives RAN paging and RRC connection resume is not ongoing (715), UE initiates the RRC connection resumption procedure with resumeCause set to ma-Update (725).

Embodiment 4-4

UE is in RRC_CONNECTED state. UE receives RRCRelease message from gNB, wherein the RRCRelease message includes suspend configuration. Value of timer T380 is also configured in the received RRCRelease message. Suspend configuration includes full I-RNTI.

UE enters RRC_INACTIVE state as the received RRCRelease message includes suspend configuration. UE also starts the timer T380 as the value of timer T380 is included in the received RRCRelease message.

If T380 expires, UE performs the following operation:
UE checks whether RRC connection resume is ongoing or not (i.e. if the timer T319 or SDT timer is running or not; note that timer T319 is running if RRC connection resume for non SDT is ongoing and SDT timer is running if RRC connection resume for SDT is ongoing)
If RRC connection resume is ongoing (i.e. either T319 or SDT timer is running):
    do not initiate the RRC connection resumption procedure.
Else (i.e. if RRC connection resumption is not ongoing)
    initiate the RRC connection resumption procedure with resumeCause set to rna-Update
If RAN paging is received while the UE is in RRC_INACTIVE state (i.e. in the RRC_INACTIVE state, UE receives paging message and UE identity in the paging message matches the UE's stored full I-RNTI), UE performs the following operation:
UE checks whether RRC connection resume is ongoing or not
If RRC connection resume is ongoing:
    Check whether ongoing RRC connection resume is for RAN update or not.
    If ongoing RRC connection resume is for RAN update:
        Reset MAC (or reset MAC and release the MAC configuration)
        Release RLC entity for SRB 0 or re-establish RLC entity for SRB 0;
(Alternatives):
    re-establish RLC for all RBs that are established; or
    release the RLC entity and the associated PDCP entity and SDAP for all established RBs; or
    release RLC entity for SRB 0 or discard all contents in RLC entity for SRB 0; or release the RLC entity and the associated PDCP entity and SDAP for SRB 0;
Note that SRB 0 can also be referred as CCCH.
if the UE is configured by upper layers with Access Identity 1:
  initiate the RRC connection resumption procedure with resumeCause set to mps-PriorityAccess;
else if the UE is configured by upper layers with Access Identity 2:
  initiate the RRC connection resumption procedure with resumeCause set to mcs-PriorityAccess;
else if the UE is configured by upper layers with one or more Access Identities equal to 11-15:
  initiate the RRC connection resumption procedure with resumeCause set to highPriorityAccess;
else:
  initiate the RRC connection resumption procedure with resumeCause set to mt-Access;
Else (i.e. if RRC connection resumption is not ongoing)
  if the UE is configured by upper layers with Access Identity 1:
    initiate the RRC connection resumption procedure with resumeCause set to mps-PriorityAccess;
  else if the UE is configured by upper layers with Access Identity 2:
    initiate the RRC connection resumption procedure with resumeCause set to mcs-PriorityAccess;
  else if the UE is configured by upper layers with one or more Access Identities equal to 11-15:
    initiate the RRC connection resumption procedure with resumeCause set to highPriorityAccess;
  else:
    initiate the RRC connection resumption procedure with resumeCause set to mt-Access;
Note that in an embodiment, the following operation in the above description can be included as part of RRC connection resumption procedure.
  Reset MAC (or reset MAC and release the MAC configuration)
  Release RLC entity for SRB 0 or re-establish RLC entity for SRB 0
(Alternatives):
  re-establish RLC for all RBs that are established; or
  release the RLC entity and the associated PDCP entity and SDAP for all established RBs; or
  release RLC entity for SRB 0 or discard all contents in RLC entity for SRB 0; or
  release the RLC entity and the associated PDCP entity and SDAP for SRB 0;
Note that SRB 0 can also be referred as CCCH.

Figure 8:
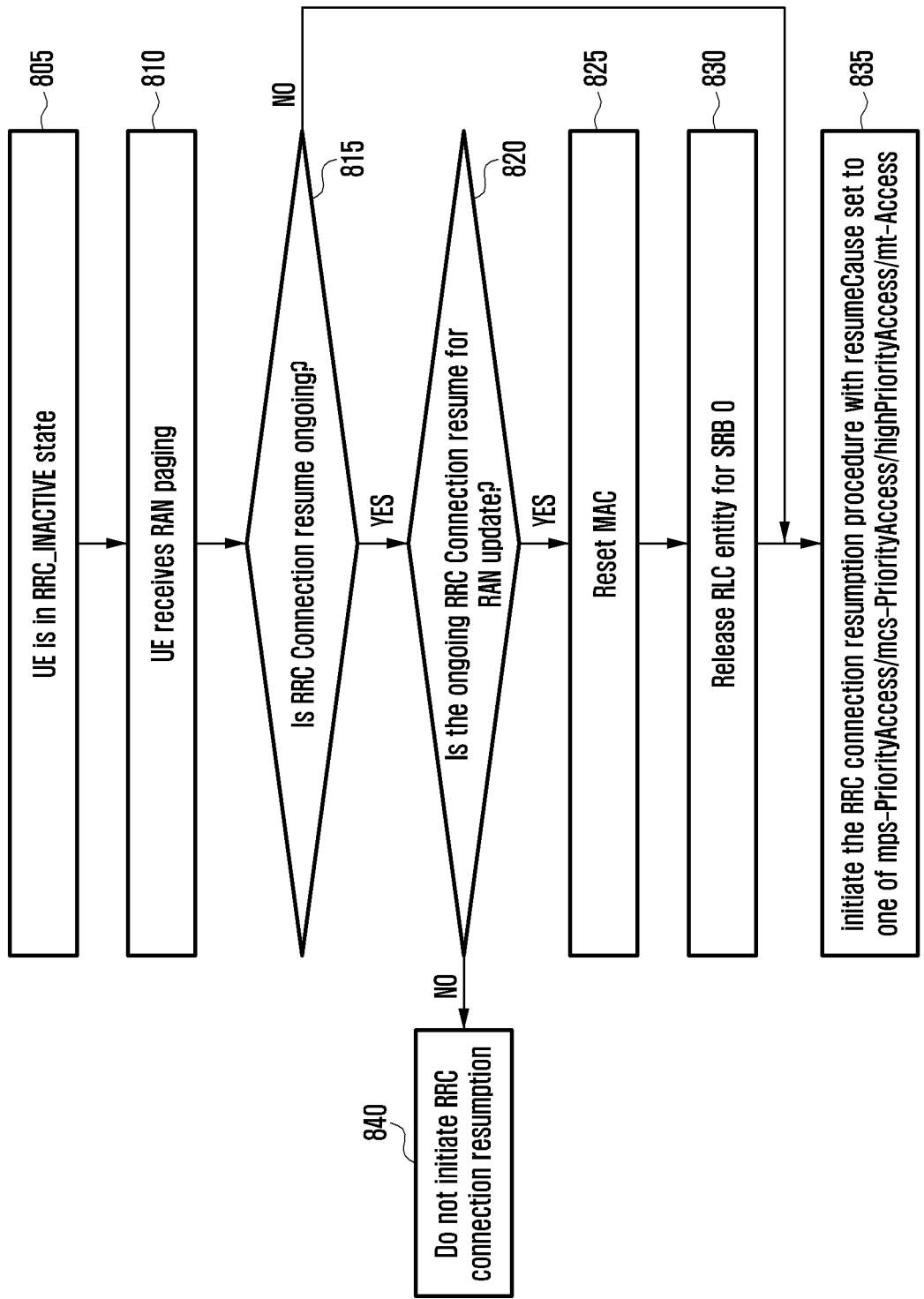
FIG. 8 illustrates another RAN paging procedure according to another embodiment of the disclosure.

FIG. 8 illustrates another RAN paging procedure according to another embodiment of the disclosure. FIG. 8 shows an example illustration of UE operation for handling RAN paging in RRC_INACTIVE according to the embodiment 4 in this disclosure.

In FIG. 8, UE is in RRC_INACTIVE state (805). When UE receives RAN paging (810), and RRC connection resume is ongoing (815), whether the ongoing RRC connection resume is for RNA update is determined (820). If the ongoing RRC connection resume is for RNA update, UE resets MAC (825), releases RLC entity for SRB0 (830), and initiates the RRC connection resumption procedure with resumeCause set to one of mps-PriorityAccess/mcs-PriorityAccess/highPriorityAccess/mt-Access (835). If the ongoing RRC connection resume is not for RNA update (820), UE does not initiate RRC connection resumption (840).

Figure 9:
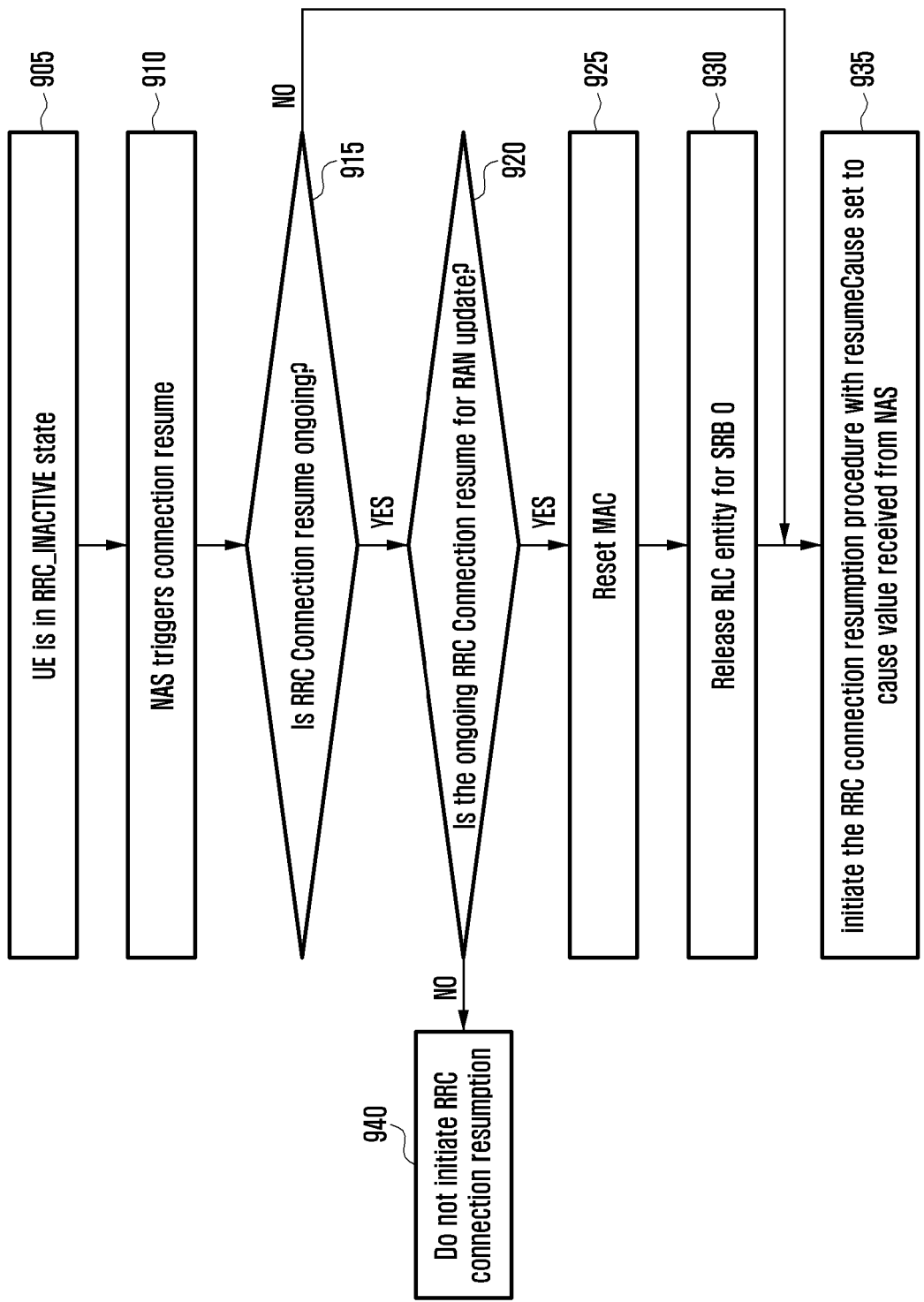
FIG. 9 illustrates a radio resource control (RRC) connection resume procedure according to an embodiment of the disclosure.

FIG. 9 illustrates a radio resource control (RRC) connection resume procedure according to an embodiment of the disclosure. FIG. 9 shows an example illustration of UE operation for handling NAS triggered RRC connection resume in RRC_INACTIVE according to the embodiment 4 in this disclosure.

In FIG. 9, UE is in RRC_INACTIVE state (905). When NAS triggers connection resume (910), and RRC connection resume is ongoing (915), whether the ongoing RRC connection resume is for RNA update is determined (920). If the ongoing RRC connection resume is for RNA update, UE resets MAC (925), releases RLC entity for SRB0 (930), and initiates the RRC connection resumption procedure with resumeCause set to cause value received from NAS (935). If the ongoing RRC connection resume is not for RNA update (920), UE does not initiate RRC connection resumption (940).

In an embodiment, T380 is stopped when UE initiate RRC Connection resume procedure in RRC_INACTIVE state. In RRC_INACTIVE state, upon initiation of RRC connection resume (e.g. resumption initiation based on NAS trigger or resumption initiated by RAN paging), UE checks if T380 is running or not. If T380 is running, UE stops T380 as illustrated in FIG. 10.

Figure 10:
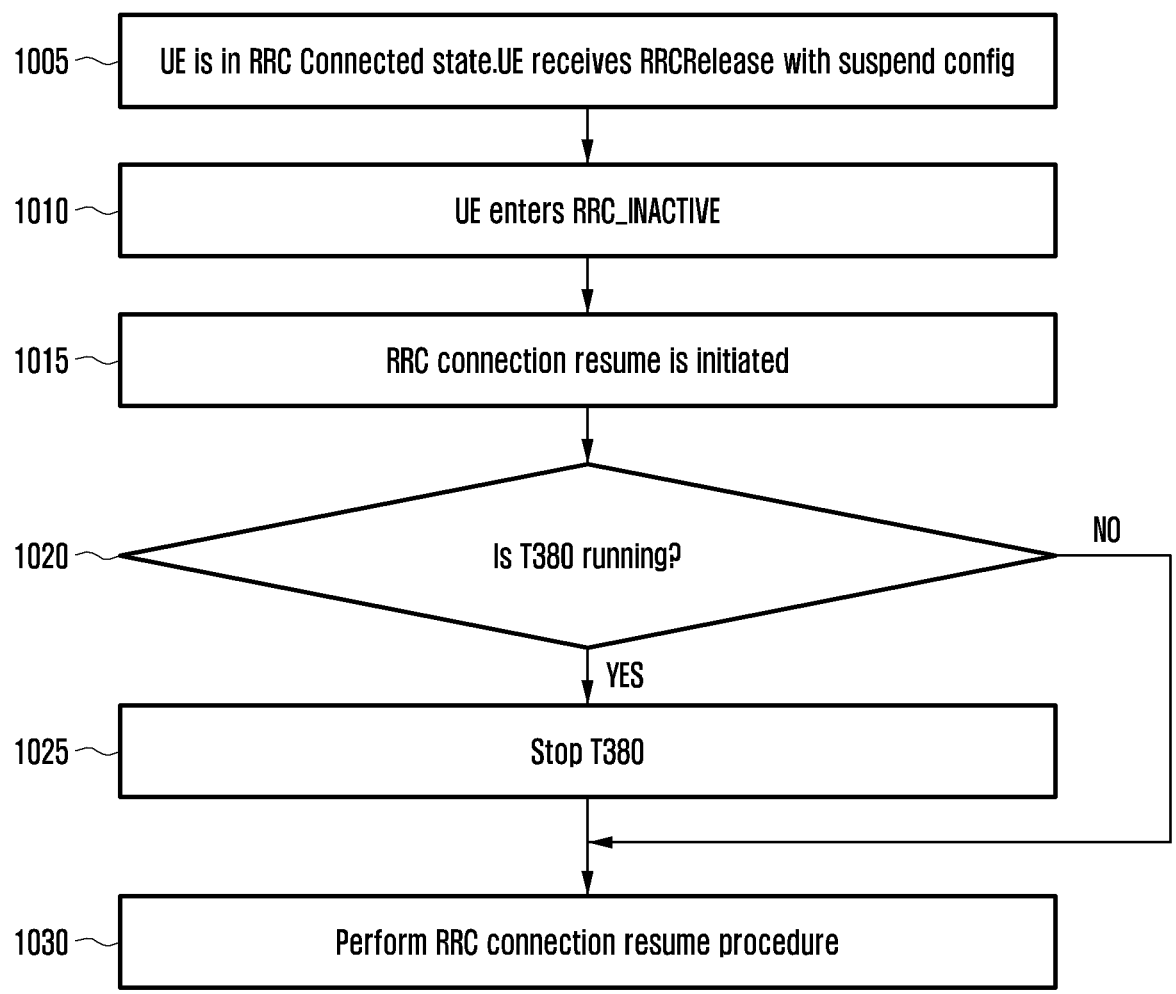
FIG. 10 illustrates another timer handling procedure according to another embodiment of the disclosure.

FIG. 10 illustrates another timer handling procedure according to another embodiment of the disclosure. In FIG. 10, UE is in RRC connected state and received RRCRelease with suspend-Config (1005). UE enters RRC_INACTIVE state (1010). When RRC connection resume is initiated (1015) and T380 is running (1020), UE stops T380 (1025) and performs RRC connection resume procedure (1030). When RRC connection resume is initiated and T380 is not running (1020), UE performs RRC connection resume procedure (1030) without stopping T380.

Embodiment 5—CG-SDT Resource Release Handling

Embodiment 5-1

Figure 11:
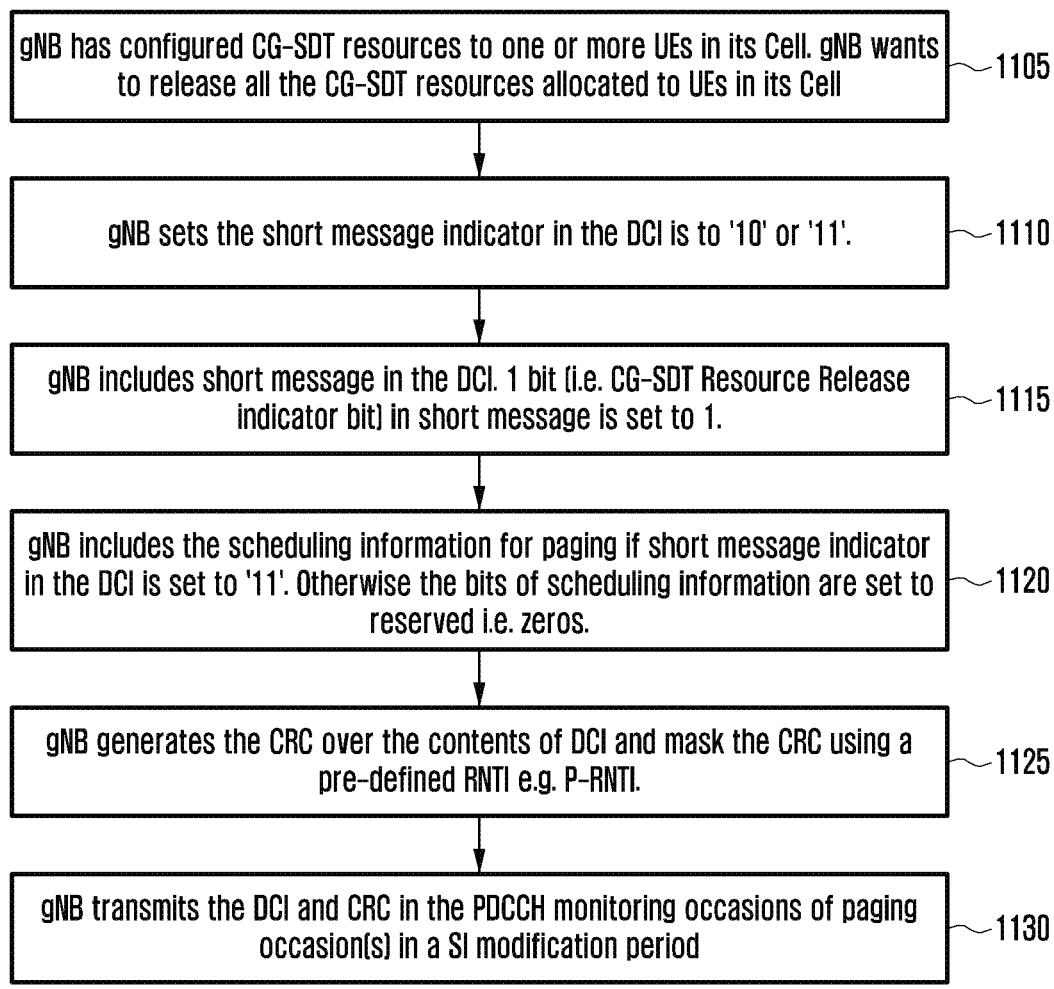
FIG. 11 illustrates another SDT related procedure according to another embodiment of the disclosure.

FIG. 11 illustrates another SDT related procedure according to another embodiment of the disclosure. FIG. 11 shows an example illustration of gNB operation for releasing CG-SDT resource according to the embodiment 5-1.

UE is in RRC Connected. UE receives RRCRelease from gNB. RRCRelease message includes suspend configuration. RRCRelease message includes/indicates CG-SDT resources i.e. configured grant resources for small data transmission. UE's SpCell is say cell X.

UE enters RRC_INACTIVE state upon receiving the RRCRelease including suspend configuration.

GNB has configured CG-SDT resource to one or more UEs in its cell. GNB wants to release CG-SDT resources configured to UEs (1105). In order to release the CG-SDT resources, gNB performs the following operations:
  GNB sets the short message indicator in the DCI to '10' or '11' (1110).
  GNB includes short message in the DCI. 1 bit (i.e. CG-SDT Resource Release indicator bit) in short message is set to 1 (1115).
  GNB includes the scheduling information (i.e. time domain resource assignment, frequency domain resource assignment, VRB to PRB mapping, MCS, TB scaling) for paging if short message indicator in the DCI is set to '11'. Otherwise the bits of scheduling information are set to reserved i.e. zeros (1120).

GNB generates the CRC over the contents of DCI and mask the CRC using a predefined RNTI e.g. P-RNTI (1125).

GNB transmits the DCI and CRC in the PDCCH monitoring occasions of paging occasion(s) in a SI modification period (say SI modification period X) (1130). Each paging occasion consists of one or more PDCCH monitoring occasions as explained earlier. Each of these PDCCH monitoring occasions of paging occasion is mapped to an SSB and gNB transmits the DCI in PDCCH monitoring occasion using the same TX beam as the corresponding SSB.

In an embodiment, wherein SUL is configured in the cell, gNB may indicate whether to release CG-SDT resources of SUL or NUL or both. For example, CG-SDT Resource Release indicator bit can be separate for SUL and NUL. In an embodiment, UL carrier is not indicated and upon receiving release indication, UE releases CG-SDT resources configured in NUL and releases CG-SDT resources configured in SUL.

Figure 12:
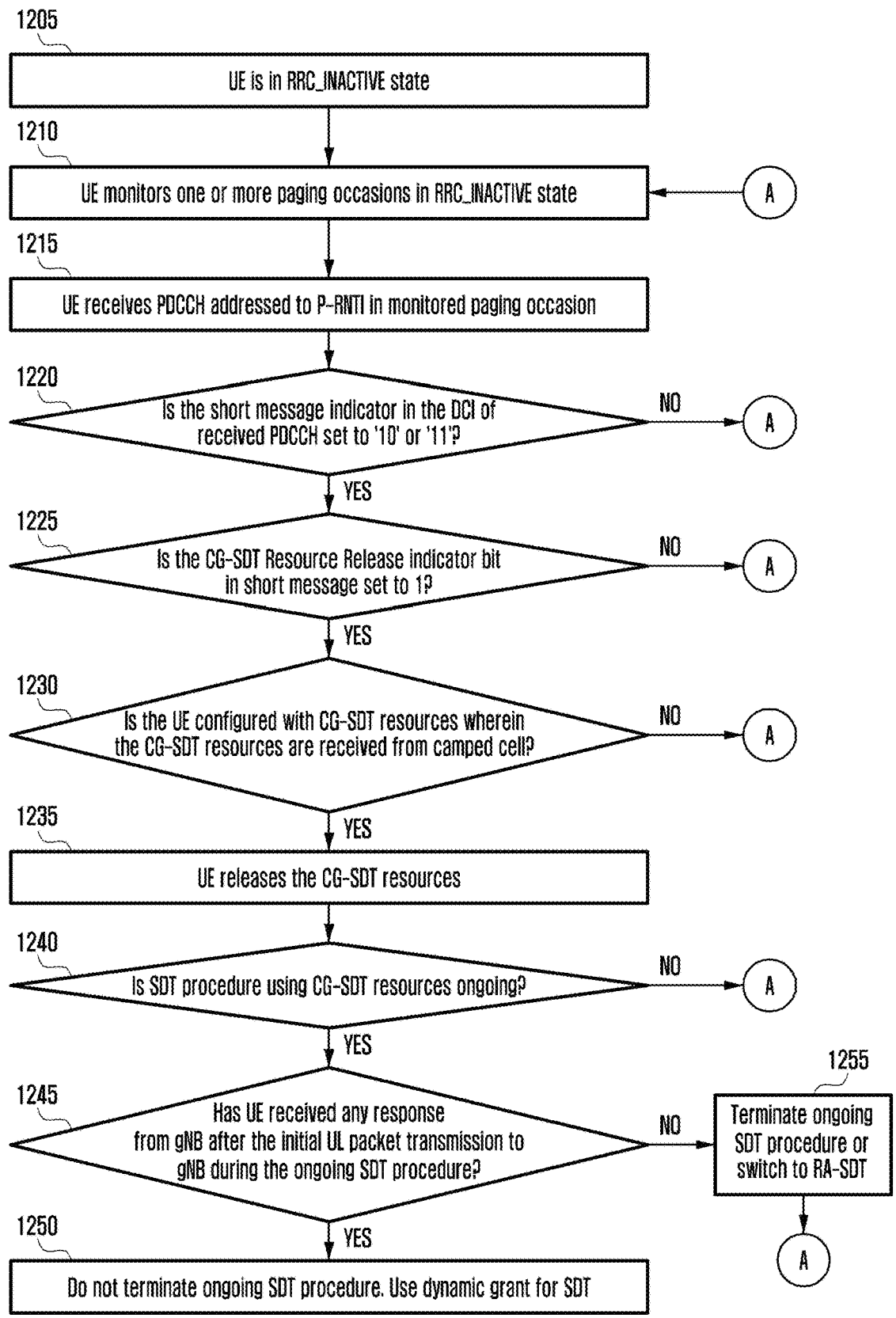
FIG. 12 illustrates another SDT related procedure according to another embodiment of the disclosure.

FIG. 12 illustrates another SDT related procedure according to another embodiment of the disclosure. FIG. 12 shows an example illustration of UE operation for releasing CG-SDT resources according to the embodiment 5-1 in this disclosure.

In the RRC_INACTIVE state (1205), UE monitors paging occasion(s) in RRC_INACTIVE state (1210).

If the UE receives PDCCH addressed to P-RNTI in the monitored paging occasion (1215) and if the short message is included in the DCI of received PDCCH (i.e. short message indicator in the DCI is to '10' or '11') (1220) and if the CG-SDT Resource Release indicator bit in short message is set to 1 (1225) and if the UE is configured with CG-SDT resources (which are received from camped cell) (1230), UE perform the following operation:

- UE releases the CG-SDT resources (1235). CG-SDT resources can be released immediately. Alternately, they can be released from next SI modification period (i.e. SI modification period X+1 if short message is received in SI modification period X). In an embodiment, wherein SUL is configured in the cell, UE release CG-SDT resources of SUL or NUL or both as indicated by gNB.
- UE further checks if SDT procedure using CG-SDT resources (or using CG-SDT resources which GNB has indicated to release) is ongoing or not (1240).
- If SDT procedure using CG-SDT resources (or using CG-SDT resources which GNB has indicated to release) is ongoing:
  - UE checks whether it has received any response (e.g. HARQ ACK, or L1 ACK or PDCCH addressed to C-RNTI/SDT-RNTI, or UE has received RRC message or DCCH SDU, etc.) from gNB after the initial UL packet transmission to gNB during the ongoing SDT procedure (1245).
  - If response is received,
    - Do not terminate ongoing SDT procedure (1250)
    - Use dynamic grant for SDT (1250)
  - Else
    - Terminate ongoing SDT procedure (1255); or
    - UE switches to RA-SDT (1255), if random access resource for SDT are configured in the camped cell and criteria to perform RA-SDT is met.

(Alternate) If the UE receives PDCCH addressed to P-RNTI in the monitored paging occasion and if the short message is included in the DCI of received PDCCH (i.e. short message indicator in the DCI is to '10' or '11') and if the CG-SDT Resource Release indicator bit in short message is set to 1 and if the UE is configured with CG-SDT resources, UE perform the following operation:

- UE checks if SDT procedure using CG-SDT resources (or using CG-SDT resources which GNB has indicated to release) is ongoing or not.
- If SDT procedure using CG-SDT resources (or using CG-SDT resources which GNB has indicated to release) is ongoing
  - UE checks whether it has received any response (e.g. HARQ ACK, or L1 ACK or PDCCH addressed to C-RNTI/SDT-RNTI, or UE has received RRC message or DCCH SDU, etc.) from gNB after the initial UL packet transmission to gNB during the ongoing SDT procedure
  - If response is received:
    - Do not terminate ongoing SDT procedure
    - Use dynamic grant and CG for SDT
    - In an embodiment, upon completion of SDT procedure, UE releases the CG-SDT or wherein SUL is configured in the cell,
    - UE release CG-SDT resources of SUL or NUL or both as indicated by gNB.
  - Else:
    - UE releases the CG-SDT resources. CG-SDT resources can be released immediately. Alternately, they can be released from next SI modification period (i.e. SI modification period X+1 if short message is received in SI modification period X). In an embodiment, wherein SUL is configured in the cell, UE release CG-SDT resources of SUL or NUL or both as indicated by gNB.
    - Terminate ongoing SDT procedure; or UE switches to RA-SDT, if random access resource for SDT are configured in the camped cell and criteria to perform RA-SDT is met.
- Else (i.e. SDT procedure using CG-SDT resources is not ongoing):
  - UE releases the CG-SDT resources. CG-SDT resources can be released immediately. Alternately, they can be released from next SI modification period (i.e. SI modification period X+1 if short message is received in SI modification period X). In an embodiment, wherein SUL is configured in the cell, UE release CG-SDT resources of SUL or NUL or both as indicated by gNB.

Criteria for selecting CG-SDT: CG-SDT criteria is considered met, if all of the following conditions are met, 1) available data volume <=data volume threshold (data volume threshold is signaled by gNB and can be specific to CG-SDT or common for CG-SDT and RA-SDT)

2) RSRP (cell quality or RSRP of path loss reference) is greater than or equal to a configured threshold (threshold is signaled by gNB and can be specific to CG-SDT or common for CG-SDT and RA-SDT)

3) CG-SDT resources are configured on the selected UL carrier and are valid (e.g. TA is valid (TAT-SDT timer is running), UE's cell is same as the cell from which CG resources are received)

Criteria for selecting RA-SDT: RA-SDT criteria is considered met, if all of the following conditions are met 1) available data volume <=data volume threshold (data volume threshold is signaled by gNB and can be specific to CG-SDT or common for CG-SDT and RA-SDT).

2) RSRP is greater than or equal to a configured threshold (threshold is signaled by gNB and can be specific to CG-SDT or common for CG-SDT and RA-SDT)

3) 4 step RA-SDT resources are configured on the selected UL carrier and criteria to select 4 step RA SDT is met; or 3) 2 step RA-SDT resources are configured on the selected UL carrier and criteria to select 2 step RA SDT is met:

Note:
UE checks the condition 1) and 2) before UL carrier selection and RA-Type selection.
For RA-SDT, if SUL is configured in the cell, UL carrier is selected based on RSRP threshold (threshold is signaled by gNB and can be specific to CG-SDT or common for CG-SDT and RA-SDT)

RA type (2 step or 4 step) selection is performed based on RSRP threshold (threshold is signaled by gNB and can be same for SDT and non SDT RACH) as explained earlier in this disclosure.

Embodiment 5-2

Figure 13:
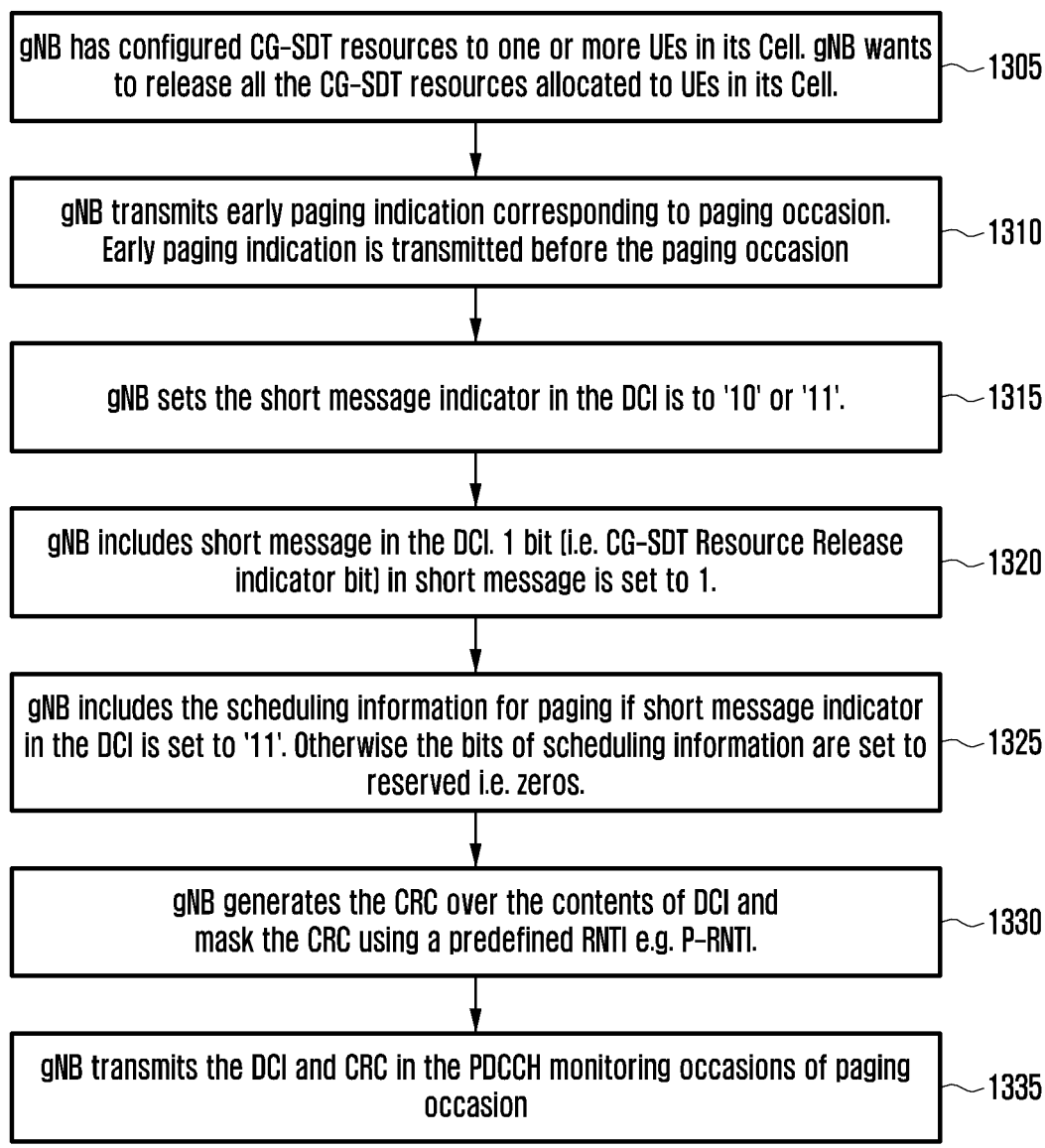
FIG. 13 illustrates another SDT related procedure according to another embodiment of the disclosure.

FIG. 13 illustrates another SDT related procedure according to another embodiment of the disclosure. FIG. 13 shows an example illustration of gNB operation for releasing CG-SDT resources according to the embodiment 5-2 in this disclosure.

UE is in RRC Connected. UE receives RRCRelease from gNB. RRCRelease message includes suspend configuration. RRCRelease message includes/indicates CG-SDT resources i.e. configured grant resources for small data transmission. UE's SpCell is say cell X.

UE enters RRC_INACTIVE state upon receiving the RRCRelease including suspend configuration.

GNB has configured CG-SDT resources to one or more UEs in its cell. GNB wants to release CG-SDT resources configured to UEs (1305). In order to release the CG-SDT resources, gNB performs the following operations for paging occasions(s) in a SI modification period (say SI modification period X).

GNB transmits early paging indication corresponding to paging occasion. Early paging indication is transmitted before the paging occasion (1310). Early paging indication can be a PDCCH addressed to a pre-defined RNTI.
common group ID can be included or bit corresponding to common group ID can be set to 1 in early paging indication, if group ID is supported. Alternately, one group ID can be reserved for indicating CG-SDT resource release and this group ID can be included or bit corresponding to this group ID can be set to 1 in early paging indication.

GNB sets the short message indicator in the DCI is to '10' or '11' (1315).

GNB includes short message in the DCI. 1 bit (i.e. CG-SDT Resource Release indicator bit) in short message is set to 1 (1320). In an embodiment, wherein SUL is configured in the cell, gNB may indicate whether to release CG-SDT resources of SUL or NUL or both. For example, CG-SDT Resource Release indicator bit can be separate for SUL and NUL. In an embodiment, UL carrier is not indicated and upon receiving release indication, UE releases CG-SDT resources configured in NUL and releases CG-SDT resources configured in SUL.

GNB includes the scheduling information (i.e. time domain resource assignment, frequency domain resource assignment, VRB to PRB mapping, MCS, TB scaling) for paging if short message indicator in the DCI is set to '11'. Otherwise the bits of scheduling information are set to reserved i.e. zeros (1325).

GNB generates the CRC over the contents of DCI and mask the CRC using a predefined RNTI e.g. P-RNTI (1330).

GNB transmits the DCI and CRC in the PDCCH monitoring occasions of the paging occasion (1335). Each paging occasion consists of one or more PDCCH monitoring occasions as explained earlier. Each of these PDCCH monitoring occasions of paging occasion is mapped to an SSB and gNB transmits the DCI in PDCCH monitoring occasion using the same TX beam as the corresponding SSB.

Figure 14:
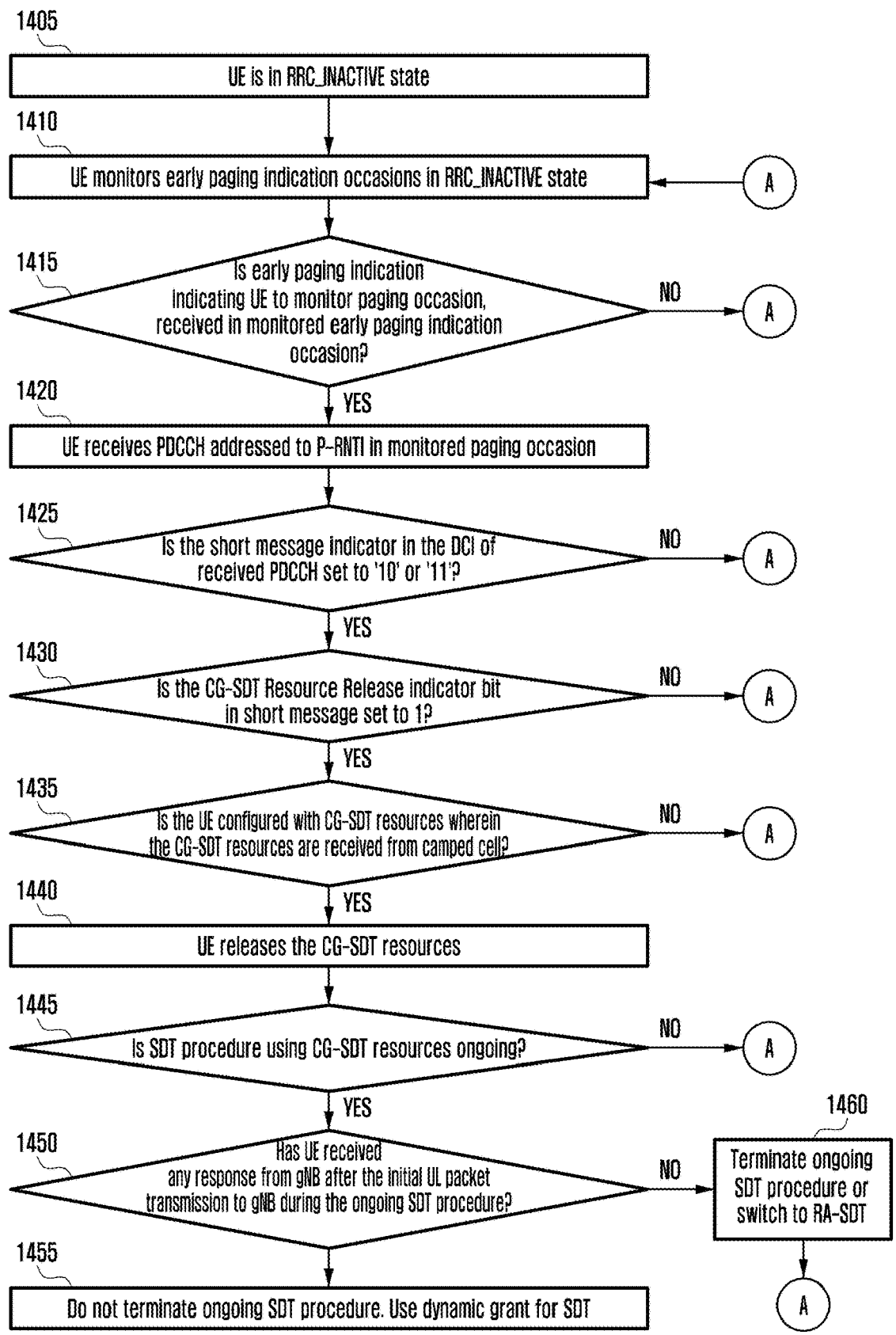
FIG. 14 illustrates another SDT related procedure according to another embodiment of the disclosure.

FIG. 14 illustrates another SDT related procedure according to another embodiment of the disclosure. FIG. 14 shows an example illustration of UE operation for releasing CG-SDT resources according to the embodiment 5-2 in this disclosure.

In the RRC_INACTIVE state (1405), UE monitors early paging indication occasions before the paging occasion(s) in RRC_INACTIVE state (1410). If UE receives early paging indication indicating UE to monitor paging occasion (1415), UE monitors paging occasion. In an embodiment, UE may monitor paging occasion if early paging indication is received in monitored early paging indication occasion. In an alternate embodiment, UE may monitor paging occasion if it includes identity of one or more groups to which UE is associated or if bit corresponding to one or more groups to which UE is associated is set to 1. Groups to which UE is associated can be a common group or group assigned by gNB or group determined by UE based on its UE ID or paging arrival rate or paging probability, etc.

If the UE receives PDCCH addressed to P-RNTI in the monitored paging occasion (1420) and if the short message is included in the DCI of received PDCCH (i.e. short message indicator in the DCI is to '10' or '11') (1425) and if the CG-SDT Resource Release indicator bit in short message is set to 1 (1430) and if the UE is configured with CG-SDT resources (which are received from camped cell) (1435), UE perform the following operation:

UE releases the CG-SDT resources (1440). CG-SDT resources can be released immediately. Alternately, they can be released from next SI modification period (i.e. SI modification period X+1 if short message is received in SI modification period X). In an embodiment, wherein SUL is configured in the cell, UE release CG-SDT resources of SUL or NUL or both as indicated by gNB.

UE further checks if SDT procedure using CG-SDT resources is ongoing or not (1445).

If SDT procedure using CG-SDT resources is ongoing:
UE checks whether it has received any response (e.g. HARQ ACK, or L1 ACK or PDCCH addressed to C-RNTI/SDT-RNTI, or UE has received RRC message or DCCH SDU, etc.) from gNB after the initial UL packet transmission to gNB during the ongoing SDT procedure (1450).

If response is received,
Do not terminate ongoing SDT procedure (1455)
Use dynamic grant for SDT (1455)

Else
- Terminate ongoing SDT procedure (1460); or
- UE switches to RA-SDT (1460), if random access resource for SDT are configured in the camped cell and criteria to perform RA-SDT is met.

(Alternate) If the UE receives PDCCH addressed to P-RNTI in the monitored paging occasion and if the short message is included in the DCI of received PDCCH (i.e. short message indicator in the DCI is to '10' or '11') and if the CG-SDT Resource Release indicator bit in short message is set to 1 and if the UE is configured with CG-SDT resources, UE perform the following operation:

UE checks if SDT procedure using CG-SDT resources (or using CG-SDT resources which GNB has indicated to release) is ongoing or not.

If SDT procedure using CG-SDT resources (or using CG-SDT resources which GNB has indicated to release) is ongoing
- UE checks whether it has received any response (e.g. HARQ ACK, or L1 ACK or PDCCH addressed to C-RNTI/SDT-RNTI, or UE has received RRC message or DCCH SDU, etc.) from gNB after the initial UL packet transmission to gNB during the ongoing SDT procedure.
- If response is received,
  - Do not terminate ongoing SDT procedure
  - Use dynamic grant and CG for SDT
  - In an embodiment, upon completion of SDT procedure, UE releases the CG-SDT or wherein SUL is configured in the cell, UE release CG-SDT resources of SUL or NUL or both as indicated by gNB.
- Else
  - UE releases the CG-SDT resources. CG-SDT resources can be released immediately. Alternately, they can be released from next SI modification period (i.e. SI modification period X+1 if short message is received in SI modification period X). In an embodiment, wherein SUL is configured in the cell, UE release CG-SDT resources of SUL or NUL or both as indicated by gNB.
  - Terminate ongoing SDT procedure; or UE switches to RA-SDT, if random access resource for SDT are configured in the camped cell and criteria to perform RA-SDT is met.
- Else (i.e. SDT procedure using CG-SDT resources is not ongoing)
  - UE releases the CG-SDT resources. CG-SDT resources can be released immediately. Alternately, they can be released from next SI modification period (i.e. SI modification period X+1 if short message is received in SI modification period X). In an embodiment, wherein SUL is configured in the cell, UE release CG-SDT resources of SUL or NUL or both as indicated by gNB.

Criteria for selecting CG-SDT: CG-SDT criteria is considered met, if all of the following conditions are met,
1) available data volume <=data volume threshold (data volume threshold is signaled by gNB and can be specific to CG-SDT or common for CG-SDT and RA-SDT)
2) RSRP (cell quality or RSRP of path loss reference) is greater than or equal to a configured threshold (threshold is signaled by gNB and can be specific to CG-SDT or common for CG-SDT and RA-SDT)
3) CG-SDT resources are configured on the selected UL carrier and are valid (e.g. TA is valid (TAT-SDT timer is running), UE's cell is same as the cell from which CG resources are received)

Criteria for selecting RA-SDT: RA-SDT criteria is considered met, if all of the following conditions are met
1) available data volume <=data volume threshold (data volume threshold is signaled by gNB and can be specific to CG-SDT or common for CG-SDT and RA-SDT).
2) RSRP is greater than or equal to a configured threshold (threshold is signaled by gNB and can be specific to CG-SDT or common for CG-SDT and RA-SDT)
3) 4 step RA-SDT resources are configured on the selected UL carrier and criteria to select 4 step RA SDT is met; or
3) 2 step RA-SDT resources are configured on the selected UL carrier and criteria to select 2 step RA SDT is met:

Note:
- UE checks the condition 1) and 2) before UL carrier selection and RA-Type selection.
- For RA-SDT, if SUL is configured in the cell, UL carrier is selected based on RSRP threshold (threshold is signaled by gNB and can be specific to CG-SDT or common for CG-SDT and RA-SDT)
- RA type (2 step or 4 step) selection is performed based on RSRP threshold (threshold is signaled by gNB and can be same for SDT and non SDT RACH) as explained earlier in this disclosure.

If UE supports early paging indication and early paging indication, UE perform operations according to this embodiment i.e. embodiment 5-2. Otherwise, UE perform operations according to embodiment 5-1. If network supports early paging indication gNB perform operations according to this embodiment i.e. embodiment 5-2. Otherwise, gNB perform operations according to embodiment 5-1.

Embodiment 5-3

Figure 15:
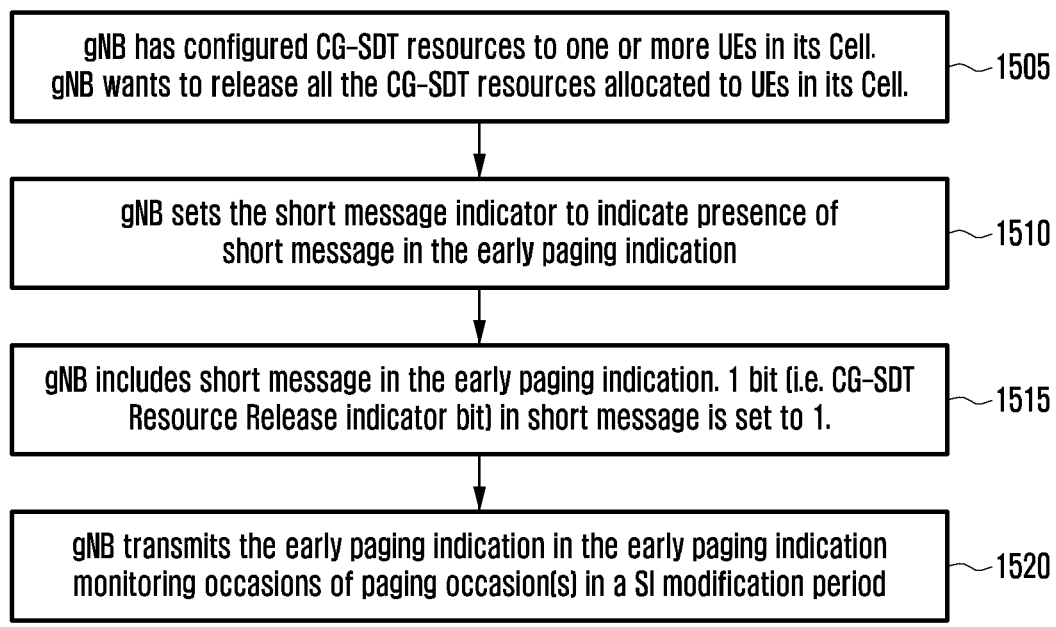
FIG. 15 illustrates another SDT related procedure according to another embodiment of the disclosure.

FIG. 15 illustrates another SDT related procedure according to another embodiment of the disclosure. FIG. 15 shows an example illustration of gNB operation for releasing CG-SDT resources according to the embodiment 5-3 in this disclosure.

UE is in RRC Connected. UE receives RRCRelease from gNB. RRCRelease message includes suspend configuration. RRCRelease message includes/indicates CG-SDT resources i.e. configured grant resources for small data transmission. UE's SpCell is say cell X.

UE enters RRC_INACTIVE state upon receiving the RRCRelease including suspend configuration.

GNB has configured CG-SDT resources to one or more UEs in its cell. GNB wants to release CG-SDT resources configured to UEs (1505). In order to release the CG-SDT resources, gNB performs the following operations for paging occasions(s) in a SI modification period (say SI modification period X).

- GNB transmits early paging indication corresponding to paging occasion. Early paging indication is transmitted before the paging occasion. Early paging indication can be a PDCCH addressed to a pre-defined RNTI.
- Short message indicator in early paging indication is set to indicate presence of short message in early paging indication (1510).
- GNB includes short message in the early paging indication (1515).

1 bit (i.e. CG-SDT Resource Release indicator bit) in short message is set to 1 (1515). GNB transmits the early paging indication in the early paging indication monitoring occasions of paging occasion(s) in a SI modification period (1520).

In an embodiment, wherein SUL is configured in the cell, gNB may indicate whether to release CG-SDT resources of SUL or NUL or both. For example, CG-SDT Resource Release indicator bit can be separate for SUL and NUL. In an embodiment, UL carrier is not indicated and upon receiving release indication, UE releases CG-SDT resources configured in NUL and releases CG-SDT resources configured in SUL.

Figure 16:
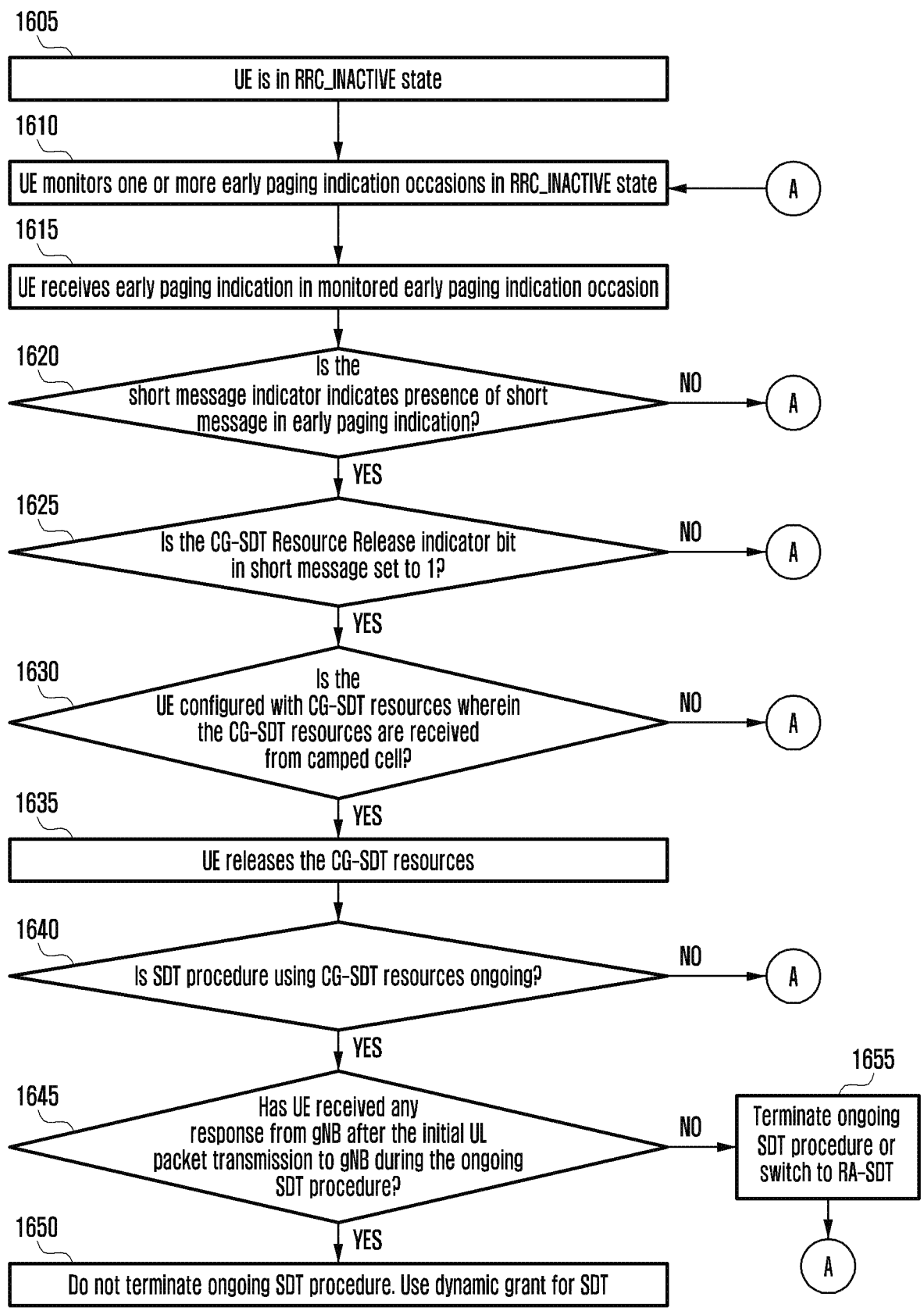
FIG. 16 illustrates another SDT related procedure according to another embodiment of the disclosure.

FIG. 16 illustrates another SDT related procedure according to another embodiment of the disclosure. FIG. 16 shows an example illustration of UE operation for releasing CG-SDT resources according to the embodiment 5-3 in this disclosure.

In the RRC_INACTIVE state (1605), UE monitors early paging indication occasions before the paging occasion(s) in RRC_INACTIVE state (1610).

If the UE receives early paging indication in the monitored early paging indication occasion (1615) and if the short message is included in the early paging indication (i.e. short message indicator is set to indicate presence of short message) (1620) and if the CG-SDT Resource Release indicator bit in short message is set to 1 (1625) and if the UE is configured with CG-SDT resources (which are received from camped cell) (1630), UE perform the following operation:

UE releases the CG-SDT resources (1635). CG-SDT resources can be released immediately. Alternately, they can be released from next SI modification period (i.e. SI modification period X+1 if short message is received in SI modification period X). In an embodiment, wherein SUL is configured in the cell, UE release CG-SDT resources of SUL or NUL or both as indicated by gNB.

UE further checks if SDT procedure using CG-SDT resources (or using CG-SDT resources which GNB has indicated to release) is ongoing or not (1640).

If SDT procedure using CG-SDT resources (or using CG-SDT resources which GNB has indicated to release) is ongoing UE checks whether it has received any response (e.g. HARQ ACK, or L1 ACK or PDCCH addressed to C-RNTI/SDT-RNTI, or UE has received RRC message or DCCH SDU, etc.) from gNB after the initial UL packet transmission to gNB during the ongoing SDT procedure (1645):

If response is received,
Do not terminate ongoing SDT procedure (1650)
Use dynamic grant for SDT (1650)

Else
Terminate ongoing SDT procedure (1655); or
UE switches to RA-SDT (1655), if random access resource for SDT are configured in the camped cell and criteria to perform RA-SDT is met.

(Alternate) If the UE receives early paging indication in the monitored early paging indication occasion and if the short message is included in the early paging indication (i.e. short message indicator is set to indicate presence of short message) and if the CG-SDT Resource Release indicator bit in short message is set to 1 and if the UE is configured with CG-SDT resources, UE perform the following operation:

UE checks if SDT procedure using CG-SDT resources (or using CG-SDT resources which GNB has indicated to release) is ongoing or not.

If SDT procedure using CG-SDT resources (or using CG-SDT resources which GNB has indicated to release) is ongoing UE checks whether it has received any response (e.g. HARQ ACK, or L1 ACK or PDCCH addressed to C-RNTI/SDT-RNTI, or UE has received RRC message or DCCH SDU, etc.) from gNB after the initial UL packet transmission to gNB during the ongoing SDT procedure:

If response is received,
Do not terminate ongoing SDT procedure
Use dynamic grant and CG for SDT
In an embodiment, upon completion of SDT procedure, UE releases the CG-SDT
or wherein SUL is configured in the cell, UE release CG-SDT resources of SUL or NUL or both as indicated by gNB.

Else
UE releases the CG-SDT resources. CG-SDT resources can be released immediately. Alternately, they can be released from next SI modification period (i.e. SI modification period X+1 if short message is received in SI modification period X). In an embodiment, wherein SUL is configured in the cell, UE release CG-SDT resources of SUL or NUL or both as indicated by gNB.

Terminate ongoing SDT procedure; or UE switches to RA-SDT, if random access resource for SDT are configured in the camped cell and criteria to perform RA-SDT is met.

Else (i.e. SDT procedure using CG-SDT resources is not ongoing)
UE releases the CG-SDT resources. CG-SDT resources can be released immediately. Alternately, they can be released from next SI modification period (i.e. SI modification period X+1 if short message is received in SI modification period X). In an embodiment, wherein SUL is configured in the cell, UE release CG-SDT resources of SUL or NUL or both as indicated by gNB.

Criteria for selecting CG-SDT: CG-SDT criteria is considered met, if all of the following conditions are met, 1) available data volume <=data volume threshold (data volume threshold is signaled by gNB and can be specific to CG-SDT or common for CG-SDT and RA-SDT)

2) RSRP (cell quality or RSRP of path loss reference) is greater than or equal to a configured threshold (threshold is signaled by gNB and can be specific to CG-SDT or common for CG-SDT and RA-SDT)

3) CG-SDT resources are configured on the selected UL carrier and are valid (e.g. TA is valid (TAT-SDT timer is running), UE's cell is same as the cell from which CG resources are received)

Criteria for selecting RA-SDT: RA-SDT criteria is considered met, if all of the following conditions are met 1) available data volume <=data volume threshold (data volume threshold is signaled by gNB and can be specific to CG-SDT or common for CG-SDT and RA-SDT).

2) RSRP is greater than or equal to a configured threshold (threshold is signaled by gNB and can be specific to CG-SDT or common for CG-SDT and RA-SDT)

3) 4 step RA-SDT resources are configured on the selected UL carrier and criteria to select 4 step RA SDT is met; or 3) 2 step RA-SDT resources are configured on the selected UL carrier and criteria to select 2 step RA SDT is met:

Note:
UE checks the condition 1) and 2) before UL carrier selection and RA-Type selection.
For RA-SDT, if SUL is configured in the cell, UL carrier is selected based on RSRP threshold (threshold is signaled by gNB and can be specific to CG-SDT or common for CG-SDT and RA-SDT)

RA type (2 step or 4 step) selection is performed based on RSRP threshold (threshold is signaled by gNB and can be same for SDT and non SDT RACH) as explained earlier in this disclosure.

Embodiment 5-4

Figure 17:
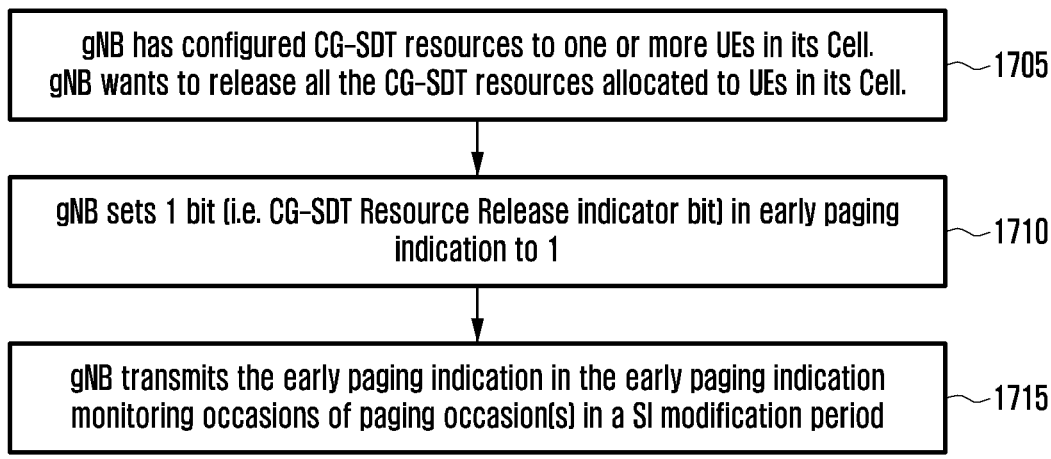
FIG. 17 illustrates another SDT related procedure according to another embodiment of the disclosure.

FIG. 17 illustrates another SDT related procedure according to another embodiment of the disclosure. FIG. 17 shows an example illustration of gNB operation for releasing CG-SDT resources according to the embodiment 5-4 in this disclosure.

UE is in RRC Connected. UE receives RRCRelease from gNB. RRCRelease message includes suspend configuration. RRCRelease message includes/indicates CG-SDT resources i.e. configured grant resources for small data transmission. UE's SpCell is say cell X.

UE enters RRC_INACTIVE state upon receiving the RRCRelease including suspend configuration.

GNB has configured CG-SDT resources to one or more UEs in its cell. GNB wants to release CG-SDT resources configured to UEs (1705). In order to release the CG-SDT resources, gNB performs the following operations for paging occasions(s) in a SI modification period (say SI modification period X).

GNB transmits early paging indication corresponding to paging occasion. Early paging indication is transmitted before the paging occasion. Early paging indication can be a PDCCH addressed to a pre-defined RNTI.

1 bit (i.e. CG-SDT Resource Release indicator bit) in Early paging indication is set to 1 (1710), and GNB transmits the early paging indication in the early paging indication monitoring occasions of paging occasion(s) in a SI modification period (1715). In an embodiment, wherein SUL is configured in the cell, gNB may indicate whether to release CG-SDT resources of SUL or NUL or both. For example, CG-SDT Resource Release indicator bit can be separate for SUL and NUL. In an embodiment, UL carrier is not indicated and upon receiving release indication, UE releases CG-SDT resources configured in NUL and releases CG-SDT resources configured in SUL.

Figure 18:
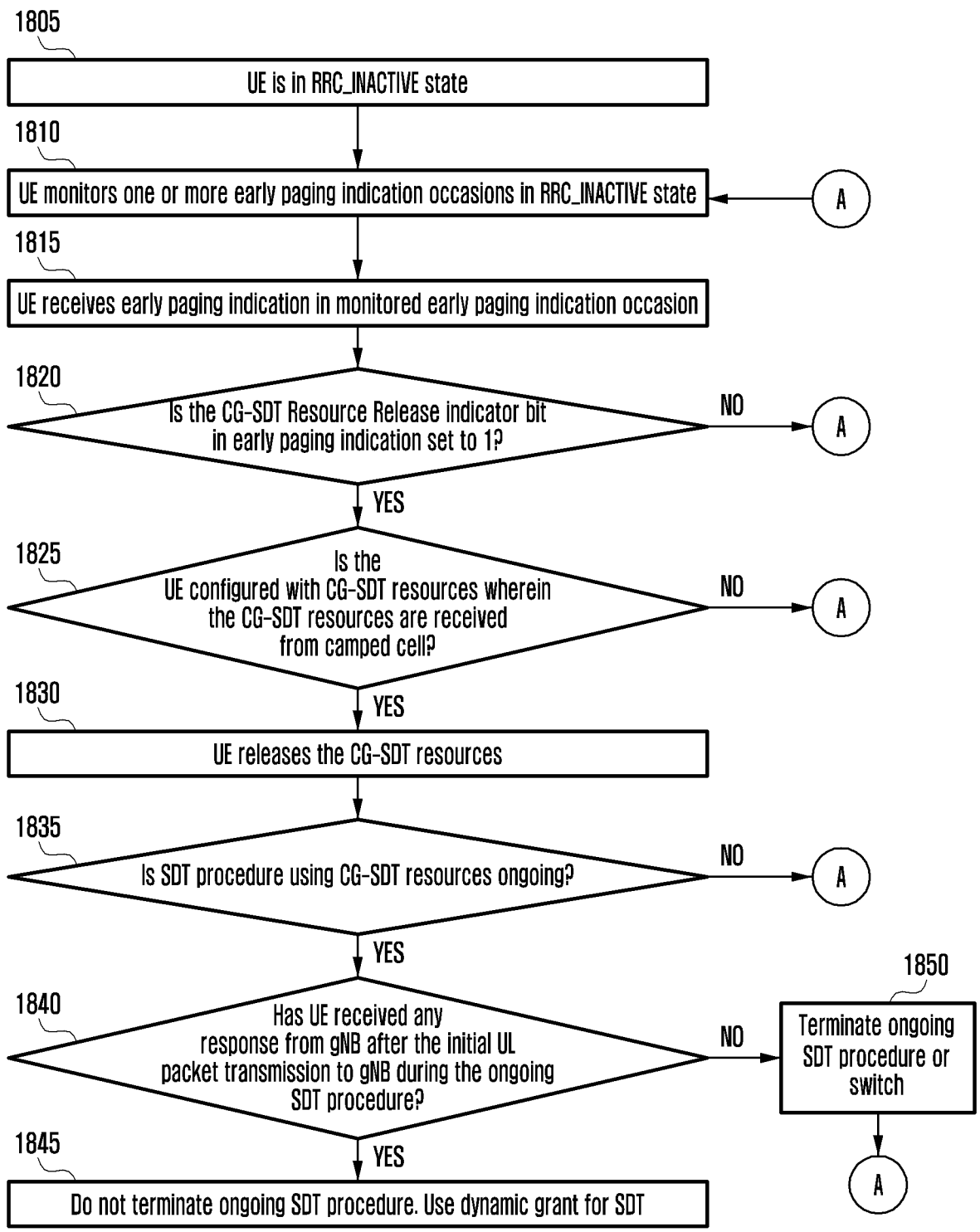
FIG. 18 illustrates another SDT related procedure according to another embodiment of the disclosure.

FIG. 18 illustrates another SDT related procedure according to another embodiment of the disclosure. FIG. 18 shows an example illustration of UE operation for releasing CG-SDT resources according to the embodiment 4 in this disclosure.

In the RRC_INACTIVE state (1805), UE monitors early paging indication occasions before the paging occasion(s) in RRC_INACTIVE state (1810).

If the UE receives early paging indication in the monitored early paging indication occasion (1815) and if the CG-SDT Resource Release indicator bit in early paging indication is set to 1 (1820) and if the UE is configured with CG-SDT resources (which are received from camped cell) (1825), UE perform the following operation:

UE releases the CG-SDT resources (1830). CG-SDT resources can be released immediately. Alternately, they can be released from next SI modification period (i.e. SI modification period X+1 if short message is received in SI modification period X). In an embodiment, wherein SUL is configured in the cell, UE release CG-SDT resources of SUL or NUL or both as indicated by gNB.

UE further checks if SDT procedure using CG-SDT resources (or using CG-SDT resources which GNB has indicated to release) is ongoing or not (1835).

If SDT procedure using CG-SDT resources (or using CG-SDT resources which GNB has indicated to release) is ongoing UE checks whether it has received any response (e.g. HARQ ACK, or L1 ACK or PDCCH addressed to C-RNTI/SDT-RNTI, or UE has received RRC message or DCCH SDU, etc.) from gNB after the initial UL packet transmission to gNB during the ongoing SDT procedure (1840):

If response is received,
Do not terminate ongoing SDT procedure (1845)
Use dynamic grant for SDT (1845)
Else
Terminate ongoing SDT procedure (1850); or
UE switches to RA-SDT (1850), if random access resource for SDT are configured in the camped cell and criteria to perform RA-SDT is met.

(Alternate) If the UE receives early paging indication in the monitored early paging indication occasion and if the CG-SDT Resource Release indicator bit in early paging indication is set to 1 and if the UE is configured with CG-SDT resources, UE perform the following operation:

UE checks if SDT procedure using CG-SDT resources (or using CG-SDT resources which GNB has indicated to release) is ongoing or not.

If SDT procedure using CG-SDT resources (or using CG-SDT resources which GNB has indicated to release) is ongoing UE checks whether it has received any response (e.g. HARQ ACK, or L1 ACK or PDCCH addressed to C-RNTI/SDT-RNTI, or UE has received RRC message or DCCH SDU, etc.) from gNB after the initial UL packet transmission to gNB during the ongoing SDT procedure If response is received,
Do not terminate ongoing SDT procedure
Use dynamic grant and CG for SDT
In an embodiment, upon completion of SDT procedure, UE releases the CG-SDT or wherein SUL is configured in the cell, UE release CG-SDT resources of SUL or NUL or both as indicated by gNB.

Else
UE releases the CG-SDT resources. CG-SDT resources can be released immediately. Alternately, they can be released from next SI modification period (i.e. SI modification period X+1 if short message is received in SI modification period X). In an embodiment, wherein SUL is configured in the cell, UE release CG-SDT resources of SUL or NUL or both as indicated by gNB.

Terminate ongoing SDT procedure; or UE switches to RA-SDT, if random access resource for SDT are configured in the camped cell and criteria to perform RA-SDT is met.

Else (i.e. SDT procedure using CG-SDT resources is not ongoing)

UE releases the CG-SDT resources. CG-SDT resources can be released immediately. Alternately, they can be released from next SI modification period (i.e. SI modification period X+1 if short message is received in SI modification period X). In an embodiment, wherein SUL is configured in the cell, UE release CG-SDT resources of SUL or NUL or both as indicated by gNB.

Criteria for selecting CG-SDT: CG-SDT criteria is considered met, if all of the following conditions are met, 1) available data volume <=data volume threshold (data volume threshold is signaled by gNB and can be specific to CG-SDT or common for CG-SDT and RA-SDT)

2) RSRP (cell quality or RSRP of path loss reference) is greater than or equal to a configured threshold (threshold is signaled by gNB and can be specific to CG-SDT or common for CG-SDT and RA-SDT)

3) CG-SDT resources are configured on the selected UL carrier and are valid (e.g. TA is valid (TAT-SDT timer is running), UE's cell is same as the cell from which CG resources are received)

Criteria for selecting RA-SDT: RA-SDT criteria is considered met, if all of the following conditions are met 1) available data volume <=data volume threshold (data volume threshold is signaled by gNB and can be specific to CG-SDT or common for CG-SDT and RA-SDT).

2) RSRP is greater than or equal to a configured threshold (threshold is signaled by gNB and can be specific to CG-SDT or common for CG-SDT and RA-SDT)

3) 4 step RA-SDT resources are configured on the selected UL carrier and criteria to select 4 step RA SDT is met; or 3) 2 step RA-SDT resources are configured on the selected UL carrier and criteria to select 2 step RA SDT is met:

Note:
UE checks the condition 1) and 2) before UL carrier selection and RA-Type selection.

For RA-SDT, if SUL is configured in the cell, UL carrier is selected based on RSRP threshold (threshold is signaled by gNB and can be specific to CG-SDT or common for CG-SDT and RA-SDT)

RA type (2 step or 4 step) selection is performed based on RSRP threshold (threshold is signaled by gNB and can be same for SDT and non SDT RACH) as explained earlier in this disclosure.

Embodiment 5-5

Figure 19:
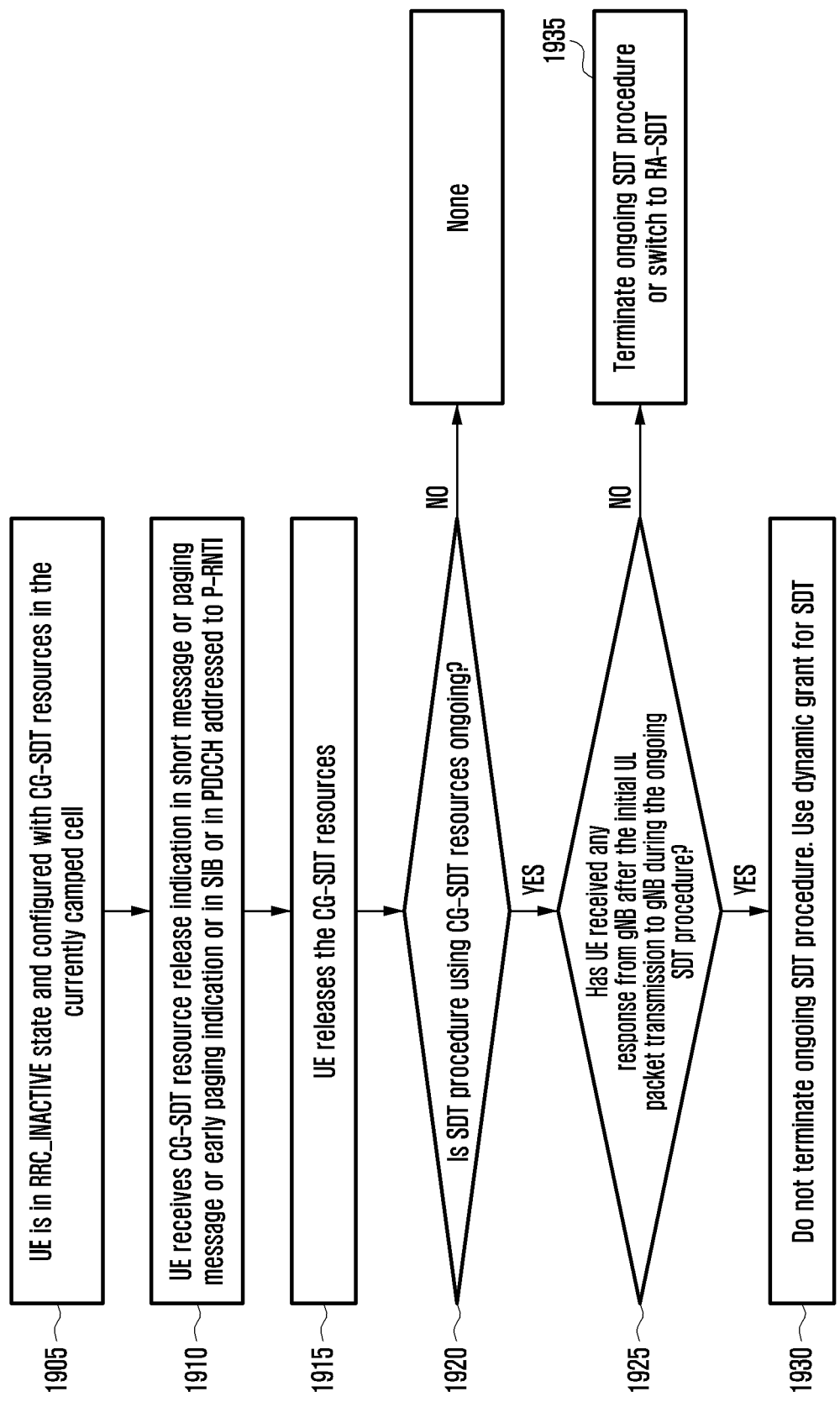
FIG. 19 illustrates another SDT related procedure according to another embodiment of the disclosure.

FIG. 19 illustrates another SDT related procedure according to another embodiment of the disclosure.

UE is in RRC_INACTIVE state and configured with CG-SDT resources in the currently camped cell (1905).

UE receives CG-SDT resource release indication in short message or paging message or early paging indication or in SIB or in PDCCH addressed to P-RNTI (1910). GNB can indicate whether to release CG-SDT resources in SUL or NUL or both. For example, release indication can be separate for SUL and NUL. Or gNB can indicate the UL carrier to be released along with release indication. In an embodiment, UL carrier is not indicated and upon receiving release indication, UE releases CG-SDT resources configured in NUL and releases CG-SDT resources configured in SUL.

UE releases the CG-SDT resources (1915). CG-SDT resources can be released immediately. Alternately, they can be released from next SI modification period (i.e. SI modification period X+1 if short message is received in SI modification period X). In an embodiment, wherein SUL is configured in the cell, UE release CG-SDT resources of SUL or NUL or both as indicated by gNB.

UE further checks if SDT procedure using CG-SDT resources (or using CG-SDT resources which GNB has indicated to release) is ongoing or not (1920).

If SDT procedure using CG-SDT resources (or using CG-SDT resources which GNB has indicated to release) is ongoing UE checks whether it has received any response (e.g. HARQ ACK, or L1 ACK or PDCCH addressed to C-RNTI/SDT-RNTI, or UE has received RRC message or DCCH SDU, etc.) from gNB after the initial UL packet transmission to gNB during the ongoing SDT procedure (1925).

If response is received,
Do not terminate ongoing SDT procedure (1930)
Use dynamic grant for SDT (1930)

Else
Terminate ongoing SDT procedure (1935); or
UE switches to RA-SDT (1935), if random access resource for SDT are configured in the camped cell and criteria to perform RA-SDT is met.

Embodiment 5-6

UE is in RRC_INACTIVE state and configured with CG-SDT resources in the currently camped cell.

UE receives CG-SDT resource release indication in short message or paging message or early paging indication or in SIB or in PDCCH addressed to P-RNTI. GNB can indicate whether to release CG-SDT resources in SUL or NUL or both. For example, release indication can be separate for SUL and NUL. Or gNB can indicate the UL carrier to be released along with release indication. In an embodiment, UL carrier is not indicated and upon receiving release indication, UE releases CG-SDT resources configured in NUL and releases CG-SDT resources configured in SUL.

UE checks if SDT procedure using CG-SDT resources (or using CG-SDT resources which GNB has indicated to release) is ongoing or not.

If SDT procedure using CG-SDT resources (or using CG-SDT resources which GNB has indicated to release) is ongoing UE checks whether it has received any response (e.g. HARQ ACK, or L1 ACK or PDCCH addressed to C-RNTI/SDT-RNTI, or UE has received RRC message or DCCH SDU, etc.) from gNB after the initial UL packet transmission to gNB during the ongoing SDT procedure If response is received,
Do not terminate ongoing SDT procedure
Use dynamic grant and CG for SDT
In an embodiment, upon completion of SDT procedure, UE releases the CG-SDT resources. In an embodiment, wherein SUL is configured in the cell, UE release CG-SDT resources of SUL or NUL or both as indicated by gNB.

Else
UE releases the CG-SDT resources. CG-SDT resources can be released immediately. Alternately, they can be released from next SI modification period (i.e. SI modification period X+1 if short message is received in SI modification period X). In an embodiment, wherein SUL is configured in the cell, UE release CG-SDT resources of SUL or NUL or both as indicated by gNB.

Terminate ongoing SDT procedure; or UE switches to RA-SDT, if random access resource for SDT are configured in the camped cell and criteria to perform RA-SDT is met.

Else (i.e. SDT procedure using CG-SDT resources (or using CG-SDT resources which GNB has indicated to release) is not ongoing)

UE releases the CG-SDT resources. CG-SDT resources can be released immediately. Alternately, they can be released from next SI modification period (i.e. SI modification period X+1 if short message is received in SI modification period X). In an embodiment, wherein SUL is configured in the cell, UE release CG-SDT resources of SUL or NUL or both as indicated by gNB.

Figure 20:
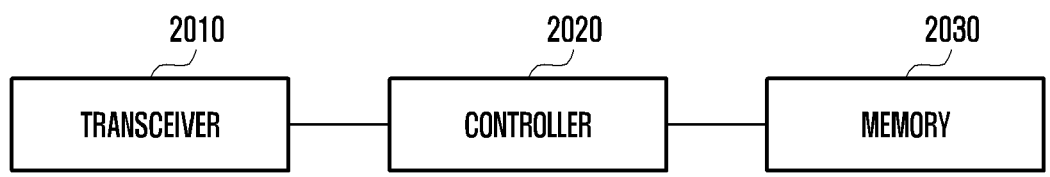
FIG. 20 is a block diagram of a terminal according to an embodiment of the disclosure.

FIG. 20 is a block diagram of a terminal according to an embodiment of the disclosure.

Referring to FIG. 20, a terminal includes a transceiver 2010, a controller 2020 and a memory 2030. The controller 2020 may refer to a circuitry, an application-specific integrated circuit (ASIC), or at least one processor. The transceiver 2010, the controller 2020 and the memory 2030 are configured to perform the operations of the terminal illustrated in the FIGS. 1 to 19, or described above. Although the transceiver 2010, the controller 2020 and the memory 2030 are shown as separate entities, they may be realized as a single entity like a single chip. Or, the transceiver 2010, the controller 2020 and the memory 2030 may be electrically connected to or coupled with each other.

The transceiver 2010 may transmit and receive signals to and from other network entities, e.g., a base station.

The controller 2020 may control the terminal to perform functions/operations according to the embodiments described above. For example, the controller 2020 controls the transceiver 2010 and/or memory 2030 to perform SDT related procedures according to various embodiments of the disclosure.

In an embodiment, the operations of the terminal may be implemented using the memory 2030 storing corresponding program codes. Specifically, the terminal may be equipped with the memory 2030 to store program codes implementing desired operations. To perform the desired operations, the controller 2020 may read and execute the program codes stored in the memory 2030 by using at least one processor or a CPU.

Figure 21:
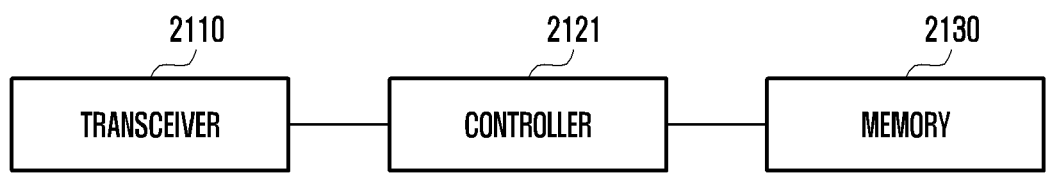
FIG. 21 is a block diagram of a base station according to an embodiment of the disclosure.

FIG. 21 is a block diagram of a base station according to an embodiment of the disclosure.

Referring to FIG. 21, a base station includes a transceiver 2110, a controller 2120 and a memory 2130. The controller 2120 may refer to a circuitry, an ASIC, or at least one processor. The transceiver 2110, the controller 2120 and the memory 2130 are configured to perform the operations of the base station illustrated in the FIGS. 1 to 19, or described above. Although the transceiver 2110, the controller 2120 and the memory 2130 are shown as separate entities, they may be realized as a single entity like a single chip. Or, the transceiver 2110, the controller 2120 and the memory 2130 may be electrically connected to or coupled with each other.

The transceiver 2110 may transmit and receive signals to and from other network entities, e.g., a terminal or a UE.

The controller 2120 may control the base station to perform functions according to the embodiments described above. For example, the controller 2120 controls the transceiver 2110 and/or memory 2130 to perform SDT related procedures according to various embodiments of the disclosure.

In an embodiment, the operations of the base station may be implemented using the memory 2130 storing corresponding program codes. Specifically, the base station may be equipped with the memory 2130 to store program codes implementing desired operations. To perform the desired operations, the controller 2120 may read and execute the program codes stored in the memory 2130 by using at least one processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

As described above, embodiments disclosed in the specification and drawings are merely used to present specific examples to easily explain the contents of the disclosure and to help understanding, but are not intended to limit the scope of the disclosure. Accordingly, the scope of the disclosure should be analyzed to include all changes or modifications derived based on the technical concept of the disclosure in addition to the embodiments disclosed herein.

The invention claimed is:

1. A method performed by a terminal in a wireless communication system, the method comprising:
   identifying whether a configured grant-based small data transmission (CG-SDT) timing alignment timer (TAT) expires while a CG-SDT procedure is ongoing;
   in case that the CG-SDT TAT expires, identifying whether a physical data control channel (PDCCH) addressed to cell-radio network temporary identity (RNTI) has been received after an initial transmission for the CG-SDT procedure; and
   in case that the PDCCH addressed to the C-RNTI has not been received after the initial transmission for the CG-SDT procedure, determining that the ongoing CG-SDT procedure is terminated.

2. The method of claim 1, wherein an uplink grant for CG-SDT is not used, based on expiry of the CG-SDT TAT, and
   wherein the terminal, in a radio resource control (RRC) inactive state, transitions to an RRC idle state, based on the ongoing CG-SDT procedure being terminated.

3. The method of claim 1, wherein the initial transmission for the CG-SDT procedure is performed with a radio resource control (RRC) resume request message on a common control channel.

4. The method of claim 1, further comprising:
   in case that the PDCCH has not been received after the initial transmission for the CG-SDT procedure, not performing any transmission except a random access preamble and a message A (MSGA) transmission.

5. The method of claim 1, further comprising:
   initiating a random access procedure, based on expiry of the CG-SDT TAT during the ongoing CG-SDT procedure.

6. The method of claim 1, further comprising:
   receiving, from a base station, a radio resource control (RRC) release message including information on a suspend configuration and information on an SDT configuration, wherein the information on the SDT configuration includes a value of the CG-SDT TAT.

7. The method of claim 6,
wherein whether the CG-SDT procedure is triggered is identified based on the SDT configuration.

8. A terminal in a wireless communication system, the terminal comprising:
a transceiver; and
a controller configured to:
identify whether a configured grant-based small data transmission (CG-SDT) timing alignment timer (TAT) expires while a CG-SDT procedure is ongoing,
in case that the CG-SDT TAT expires, identify whether a physical data control channel (PDCCH) addressed to cell-radio network temporary identity (RNTI) has been received after an initial transmission for the CG-SDT procedure, and
in case that the PDCCH addressed to the C-RNTI has not been received after the initial transmission for the CG-SDT procedure, determine that the ongoing CG-SDT procedure is terminated.

9. The terminal of claim 8, wherein an uplink grant for CG-SDT is not used, based on expiry of the CG-SDT TAT, and
wherein the terminal, in a radio resource control (RRC) inactive state, transitions to an RRC idle state, based on the ongoing CG-SDT procedure being terminated.

10. The terminal of claim 8, wherein the initial transmission for the CG-SDT procedure is performed with a radio resource control (RRC) resume request message on a common control channel.

11. The terminal of claim 8, wherein, in case that the PDCCH has not been received after the initial transmission for the CG-SDT procedure, the controller is further configured not to perform any transmission except a random access preamble and a message A (MSGA) transmission.

12. The terminal of claim 8, wherein the controller is further configured to initiate a random access procedure, based on expiry of the CG-SDT TAT during the ongoing CG-SDT procedure.

13. The terminal of claim 8, wherein the controller is further configured to control the transceiver to receive, from a base station, a radio resource control (RRC) release message including information on a suspend configuration and information on an SDT configuration, and
wherein the information on the SDT configuration includes a value of the CG-SDT TAT.

14. The terminal of claim 13, wherein the controller is further configured to identify whether the CG-SDT procedure is triggered based on the SDT configuration.

* * * * *